(12) United States Patent
Nale

(10) Patent No.: US 7,693,942 B2  
(45) Date of Patent: Apr. 6, 2010

(54) METHOD AND SYSTEM FOR POSTAL SERVICE MAIL DELIVERY VIA ELECTRONIC MAIL

(76) Inventor: David S. Nale, 1390 Market St., Suite 2705, San Francisco, CA (US) 94102

( * ) Notice: Subject to any disclaimer, the term of this patent is extended or adjusted under 35 U.S.C. 154(b) by 759 days.

(21) Appl. No.: 10/241,008

(22) Filed: Sep. 10, 2002

(65) Prior Publication Data

US 2003/0074411 A1 Apr. 17, 2003

Related U.S. Application Data

(60) Provisional application No. 60/317,930, filed on Sep. 10, 2001.

(51) Int. Cl.
G06F 15/16 (2006.01)

(52) U.S. Cl. .................. 709/206; 709/202; 709/203; 709/220; 709/223; 709/246

(58) Field of Classification Search ........... 709/246, 709/201, 223, 206, 203, 202, 220  
See application file for complete search history.

(56) References Cited

U.S. PATENT DOCUMENTS

| | | | | |
|---|---|---|---|---|
| 4,106,060 A * | 8/1978 | Chapman, Jr. | ............. | 358/402 |
| 5,805,810 A | 9/1998 | Maxwell | | |
| 5,894,558 A * | 4/1999 | Falker | ........................ | 709/239 |
| 5,960,411 A | 9/1999 | Hartman et al. | | |
| 6,020,980 A | 2/2000 | Freeman | | |
| 6,151,423 A * | 11/2000 | Melen | ........................ | 382/289 |
| 6,211,972 B1 * | 4/2001 | Okutomi et al. | ............. | 358/402 |
| 6,226,626 B1 * | 5/2001 | Thiel | ........................... | 705/407 |
| 6,438,584 B1 * | 8/2002 | Powers | ....................... | 709/206 |
| 6,604,132 B1 * | 8/2003 | Hitt | ............................ | 709/206 |
| 6,608,694 B1 * | 8/2003 | Akimoto | .................... | 358/1.15 |
| 6,621,892 B1 * | 9/2003 | Banister et al. | .......... | 379/88.14 |
| 6,980,331 B1 * | 12/2005 | Mooney et al. | ............. | 358/400 |
| 7,010,144 B1 * | 3/2006 | Davis et al. | ................. | 382/100 |
| 2002/0018245 A1 * | 2/2002 | Saito et al. | .................. | 358/468 |
| 2002/0024651 A1 * | 2/2002 | Mochizuki | .................. | 355/133 |
| 2002/0054335 A1 * | 5/2002 | Sekiguchi | .................. | 358/1.15 |
| 2002/0075512 A1 * | 6/2002 | Terasaka | .................... | 358/1.15 |
| 2002/0120670 A1 * | 8/2002 | Chou | ......................... | 709/201 |

(Continued)

OTHER PUBLICATIONS

Dave Barter, PTE Project Manager; "Physical to Electronic: Royal Mail delivers mail direct to customers as electronic data, not envelopes, using InputAccel®;" 1999 Input Software, Inc.

(Continued)

*Primary Examiner*—Thu Nguyen  
*Assistant Examiner*—Lan-Dai T Truong  
(74) *Attorney, Agent, or Firm*—Foley & Lardner LLP

(57) ABSTRACT

A system and method for processing mail includes receiving a mail item, the mail item having recipient address information and one or more pages enclosed in the mail item, and scanning the mail item including the recipient address information and the enclosed one or more pages into an image file. A subscriber is identified from the recipient address information in the image file. An e-mail message is transmitted to the identified subscriber, the e-mail message indicating the reception of the mail item.

58 Claims, 34 Drawing Sheets

TAG WITH PREFERENCE FLOW DIAGRAM

U.S. PATENT DOCUMENTS

2002/0143880 A1* 10/2002 Sansone et al. ............. 709/206
2002/0174185 A1* 11/2002 Rawat et al. ................ 709/206
2003/0002068 A1   1/2003 Constantin et al. ......... 358/1.15
2006/0222204 A1* 10/2006 Rundle et al. ............... 382/101

OTHER PUBLICATIONS

Linda Rosencrance; "U.K. postal service launches corporate online mail service;" Computerworld Jun. 1, 2000.

* cited by examiner

FIG. 1 HIGH-LEVEL SYSTEM DIAGRAM
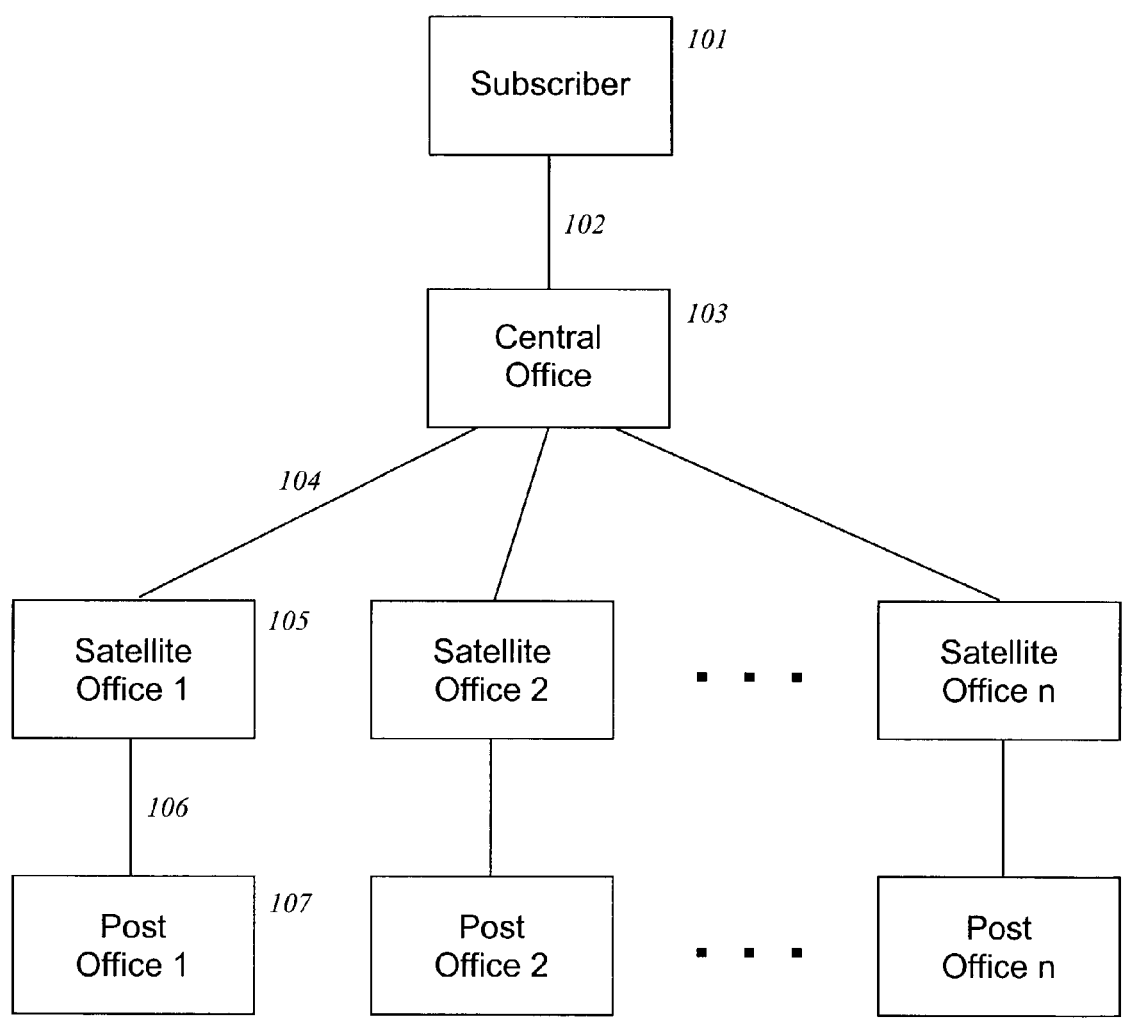

FIG. 2 HIGH LEVEL FLOW DIAGRAM
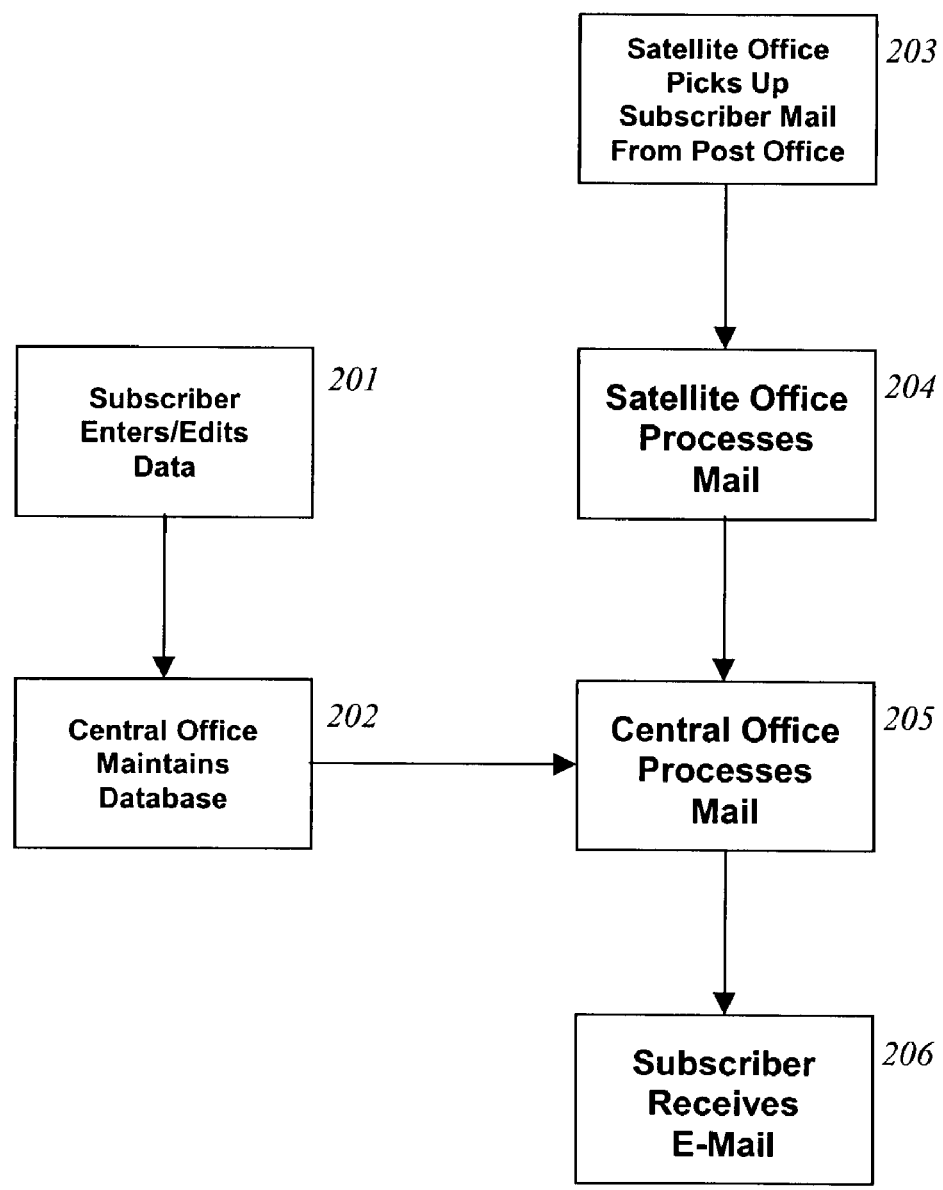

FIG. 3 SUBSCRIBER SYSTEM DIAGRAM
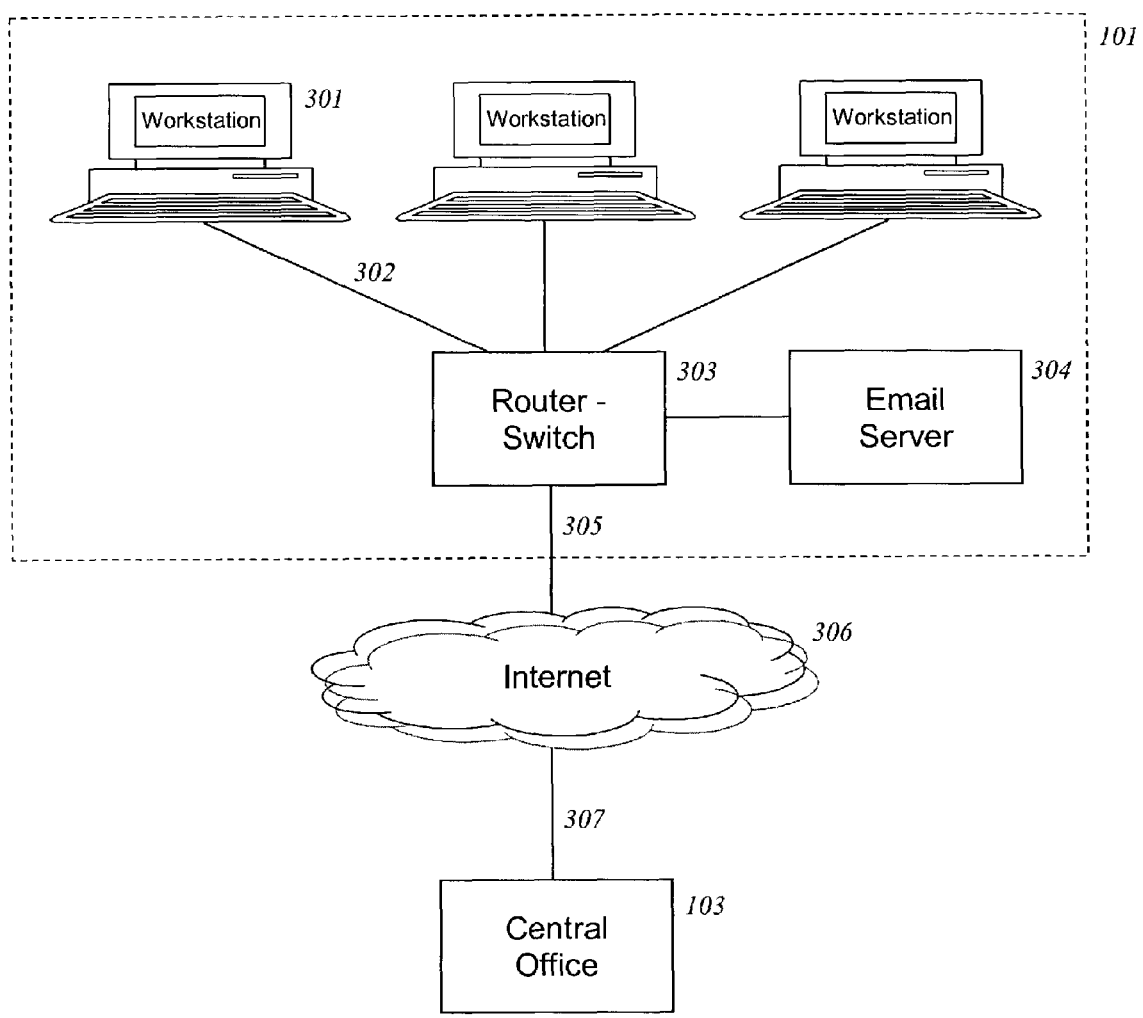

FIG. 4 SUBSCRIBER FLOW DIAGRAM
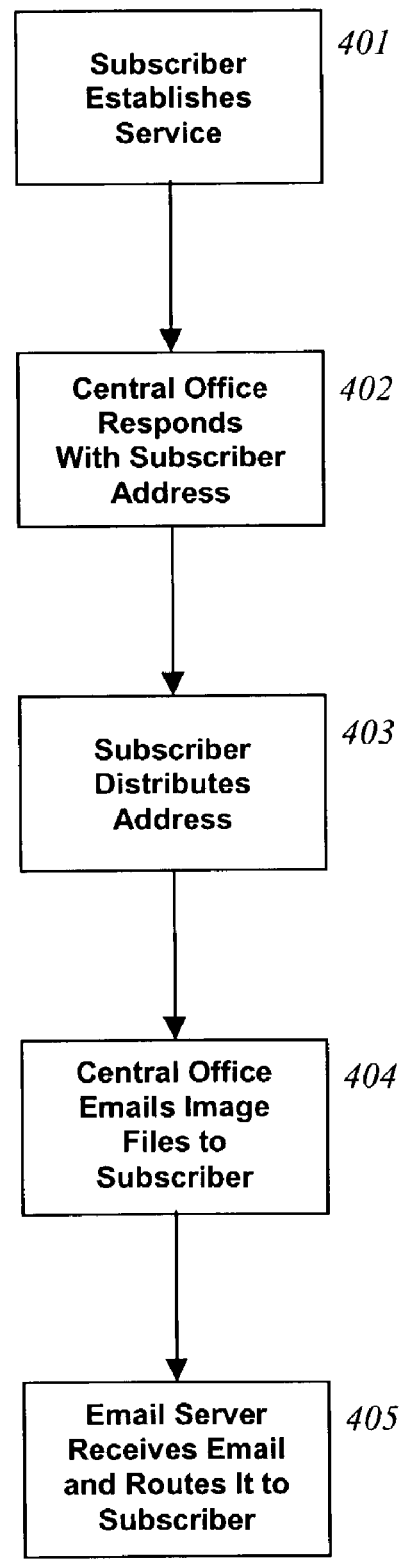

FIG. 5 HIGH LEVEL CENTRAL OFFICE SYSTEM DIAGRAM
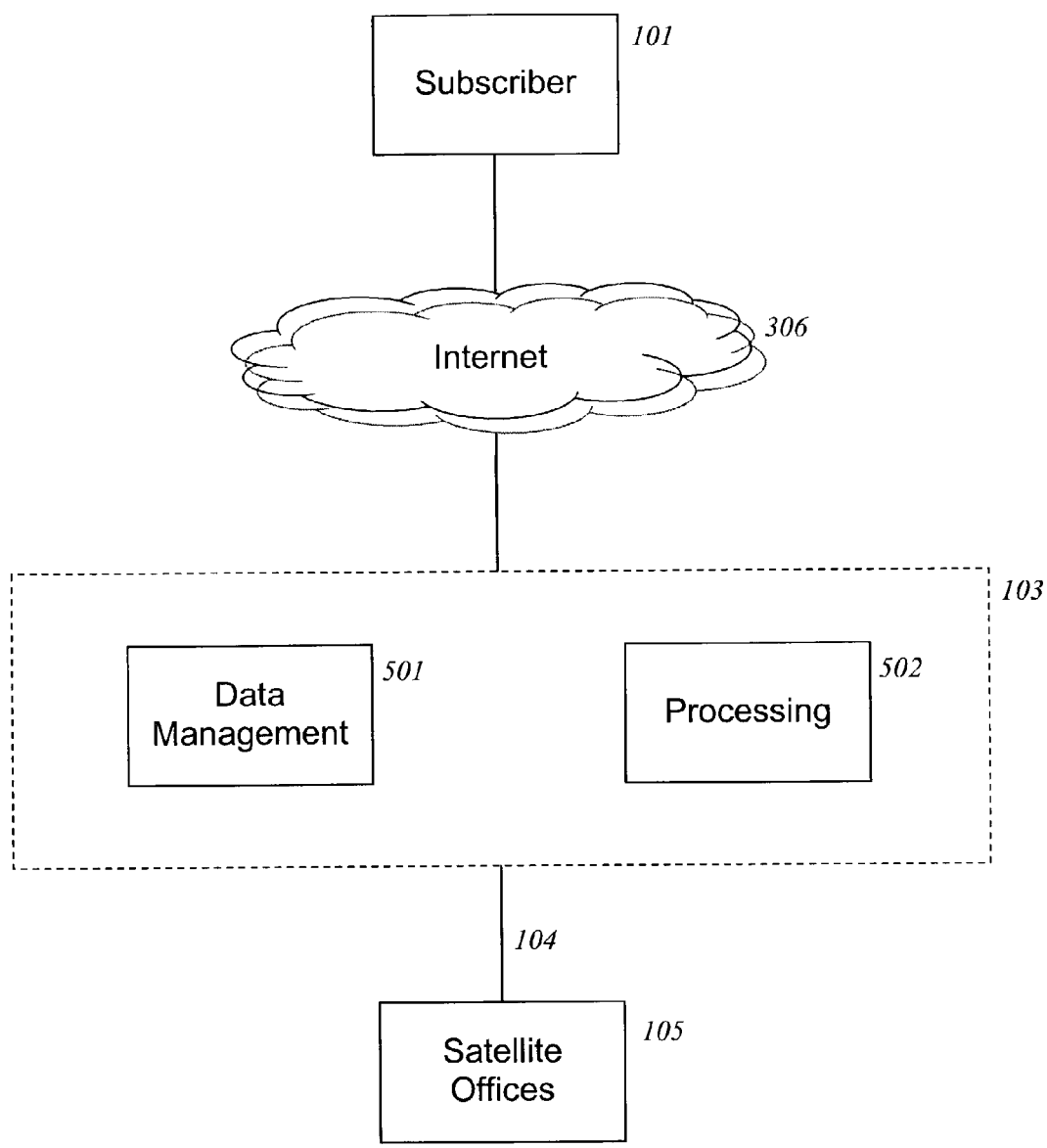

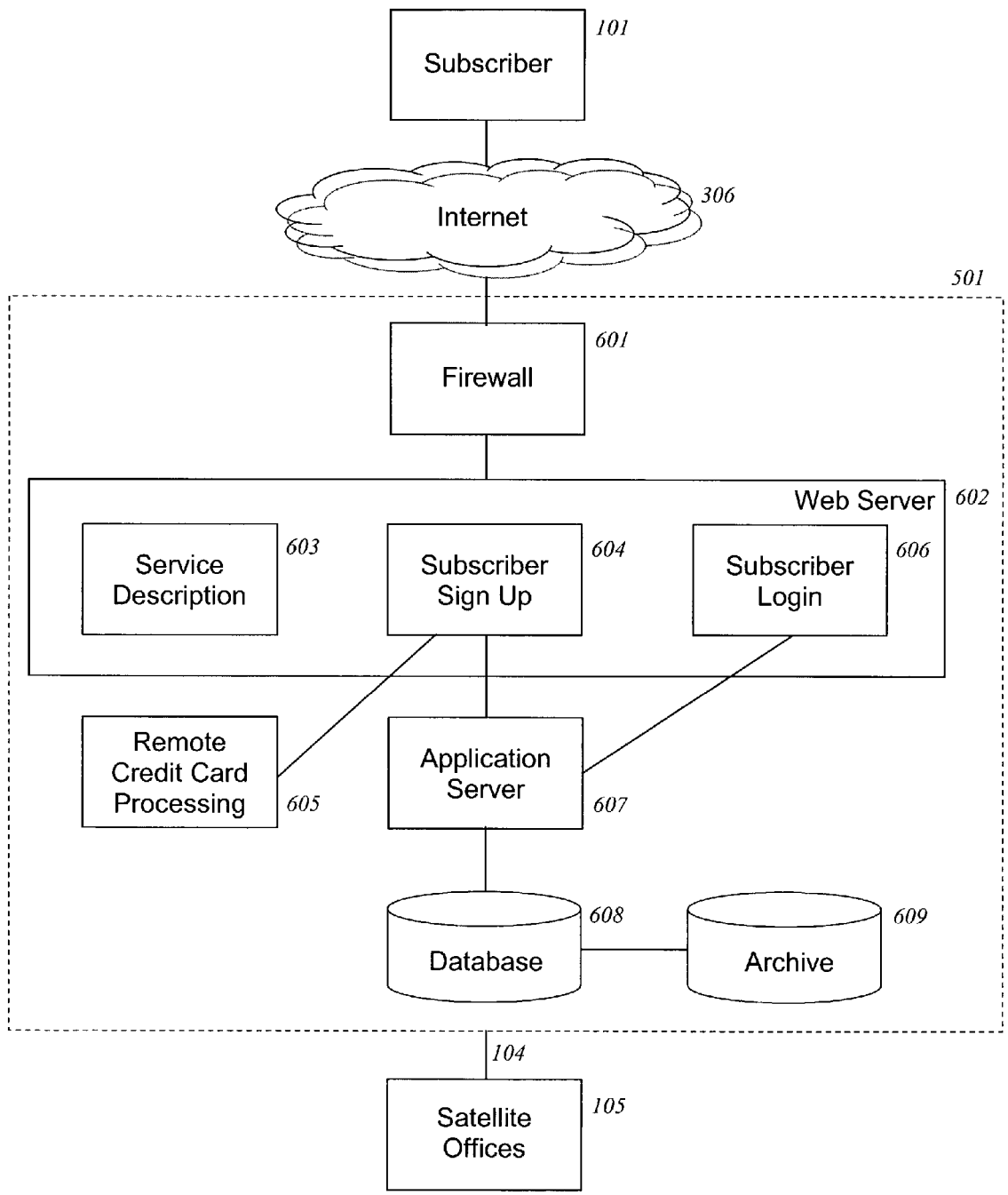
FIG. 6 CENTRAL OFFICE DATA MANAGEMENT SYSTEM DIAGRAM

FIG. 7A DATABASE ENTITY-RELATIONSHIP DIAGRAM
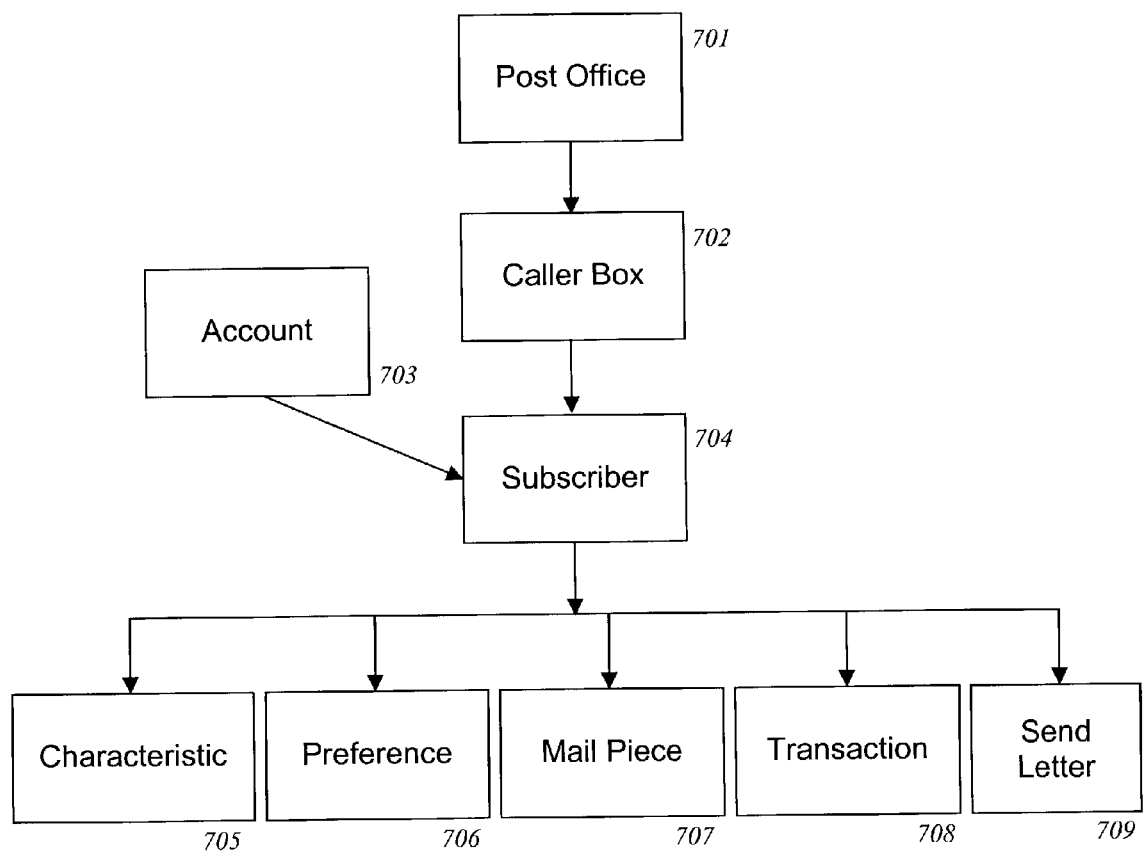

FIG. 7B DATABASE DETAIL

| ENTITY | COMPONENT | DESCRIPTION |
|---|---|---|
| 701. Post Office | 7011. Post Office Address | Location of post office (e.g. San Francisco, New York) |
| 702. Caller Box | 7021. Caller Box Number | Number assigned by the Post Office for the service. One caller box may serve up to 9,999 subscribers. |
| | 7022. Scanner Type* | Black and White or Color |
| | 7023. Hardcopy Archive* | Duration to store original mail pieces (e.g. 6 months, 3 years) |
| | 7024. First Class Only* | Does the subscriber want only First Class Mail (no "junk" mail) |
| 703. Account | 7031. Primary Subscriber | Pointer to Subscriber who administers Account (group of Subscribers) |
| 101. Subscriber | 7041. Subscriber Box Number | Unique five-digit number for the Caller Box, must start with 3 to facilitate OCR recognition |
| | 7042. User ID | Subscriber defined, must be at least 8 digits, unique to the system |
| | 7043. Password | Subscriber defined, must be at least 8 digits |
| 705. Characteristic | 7051. Name and Address | Name, Address, City, State, Zip, Province, Country – primary, billing, shipping, etc. Address Book addresses (for Send Letters) |
| | 7052. Subscriber Phone | Phone, Fax |
| | 7053. Subscriber Email | Primary and secondary email addresses where image files of postal mail will be forwarded |
| | 7054. Credit Card Data | Pointer to encrypted credit card information on the processing company's server |
| | 7055. Alternate Addressees | Additional names and company names that mail could be addressed to. With the Subscriber Box Number, helps to link mail to the Subscriber. |
| | 7056. Demographic Data | How the subscriber heard about the service, primary language, occupation, industry, gender and other information used for marketing. |
| | 7057. Service Start Date | Month, day, year service was started |
| | 7058. Service Stop Date | Month, day, year service was stopped, blank if active |
| | 7059. Pricing Terms | What subscriber has agreed to pay, usually based on a monthly service charge plus a cost per thousand images scanned and mailed. Some preferences effect pricing. |
| | 7060. Vacation Hold Start | Month, day, year to start vacation hold |
| | 7061. Vacation Hold Stop | Month, day, year to stop vacation hold |
| 706. Preference | 7061. Image Type | What type of image to send the subscriber, options include TIF, Image-Only PDF, Text and Image PDF |
| | 7062. Softcopy Archive Preference | How long does the subscriber want their images to remain in the online repository? Do they want them archived to CD and mailed to them? |
| | 7063. Forward Preference | For mail that is not scannable (e.g. parcels), does the subscriber want them returned to sender or forwarded to a specified address? |
| | 7064. Ad Preference | Does the subscriber want advertising to be included with their image files (for a reduced pricing term)? |
| | 7065. Image Quality | A number between 1-10: 1=lowest quality, smallest file size, 10=highest quality, largest file size |
| | 7066. Resize Type | Does the subscriber want the image size reduced to screen size? |
| | 7067. Attachment | Should image file be attached to email in addition to a link to the image in the document repository? |
| | 7068. Encryption | Should the image file be encrypted for added security? |
| | 7069. First Class Only | Should only first class mail be processed and all other mail destroyed? |
| 707. Mail Piece | 7071. Mail Piece Number | Unique mail piece number. From the unique bar code number on the Mail Separation Sheet. If the subscriber requests the original mail piece, the date sent to the subscriber is also noted. One record for every mail piece. |
| | 7072. Number of Pages | Number of pages in the mail piece for billing. |
| 708. Transaction | 7081. Description and amount | Any interaction with the subscriber including charges, payments and customer service notes |

FIG. 7B CONT.

| 709. Send Letter | 7091. Date Sent | Date letter was printed and mailed |
| --- | --- | --- |
| | 7092. Return Address | Pointer to Subscriber Address (see Characteristic: Name and Address) |
| | 7093. Recipient Address | Pointer to Address Book entry (see Characteristic: Name and Address) |
| | 7094. Message | Text of message to be sent |

* Indicates a subscriber preference that may not be changed without changing the Subscriber Address

FIG. 8 SUBSCRIBER ADDRESS

John Doe
Acme Enterprises
Paperless #X9999
PO Box 8888
Anytown, CA  44444

John Doe = Subscriber Name
Acme Enterprises = Subscriber Company Name or Alternate Addressee
9999 = Subscriber Box Number (3041)
X = Subscriber Number Prefix
8888 = Caller Box Number (3021)
Anytown, CA 4444 = Post Office City, State, and Zip (3011)

FIG. 9 CENTRAL OFFICE DATA MANAGEMENT FLOW DIAGRAM
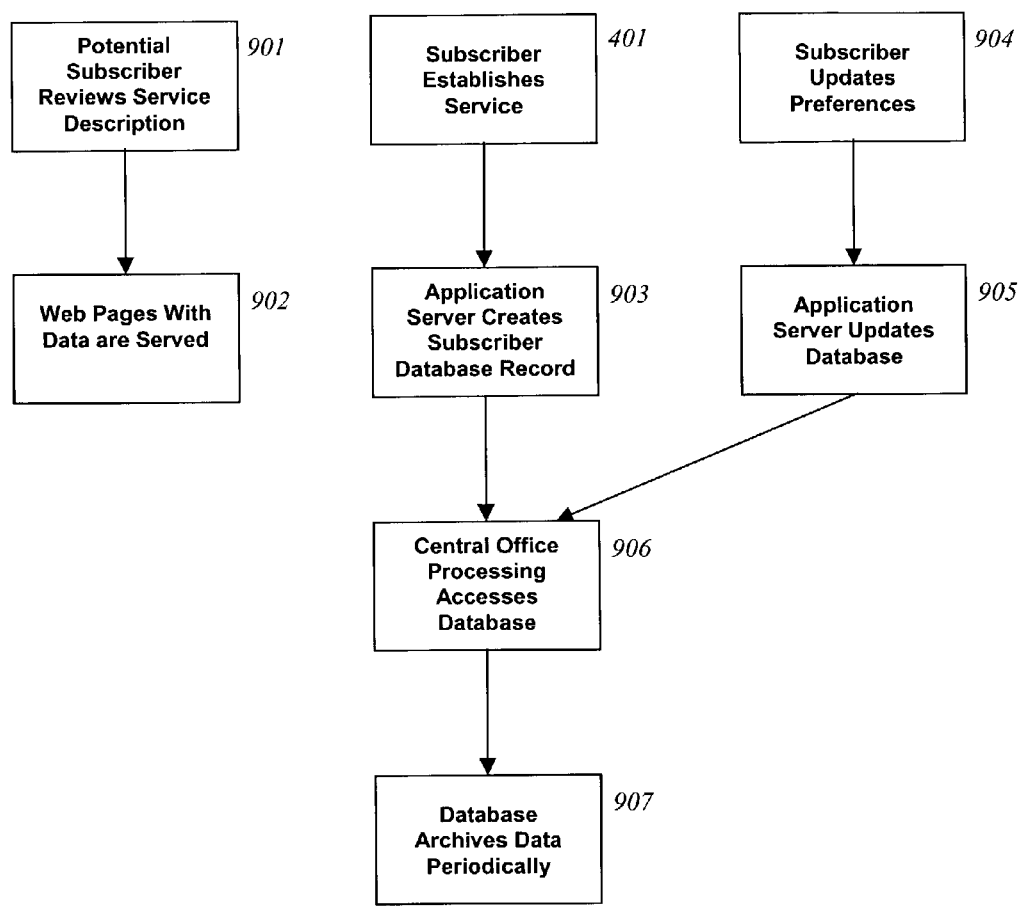

FIG. 10 SATELLITE OFFICE SYSTEM DIAGRAM
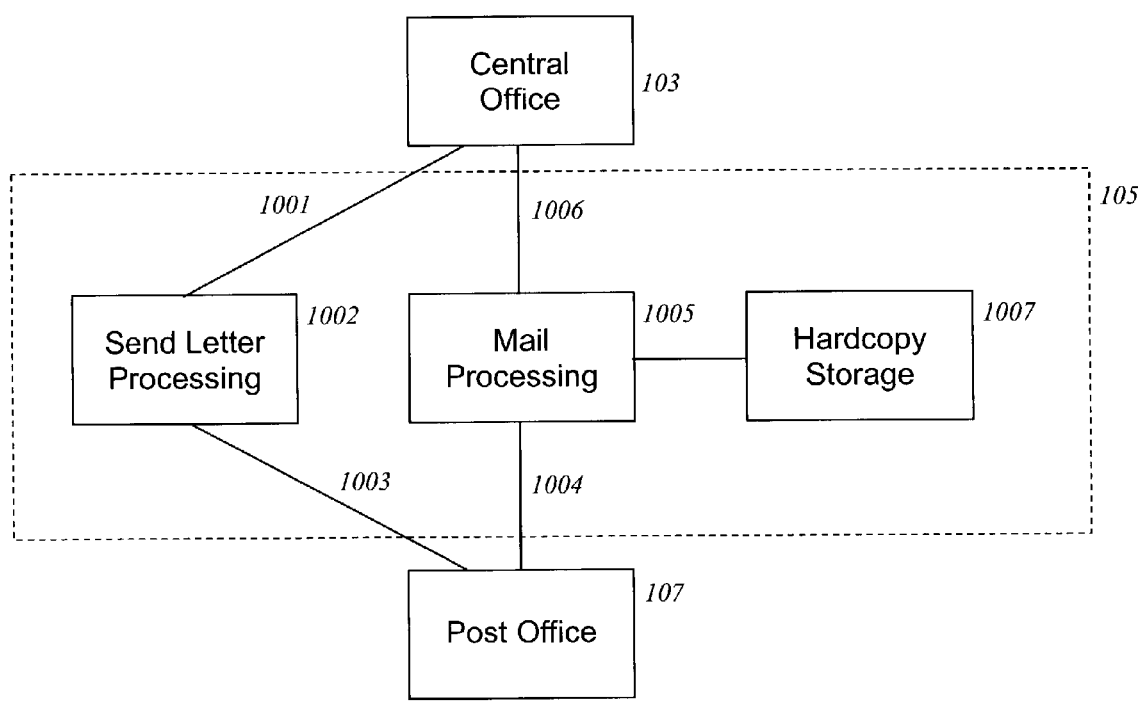

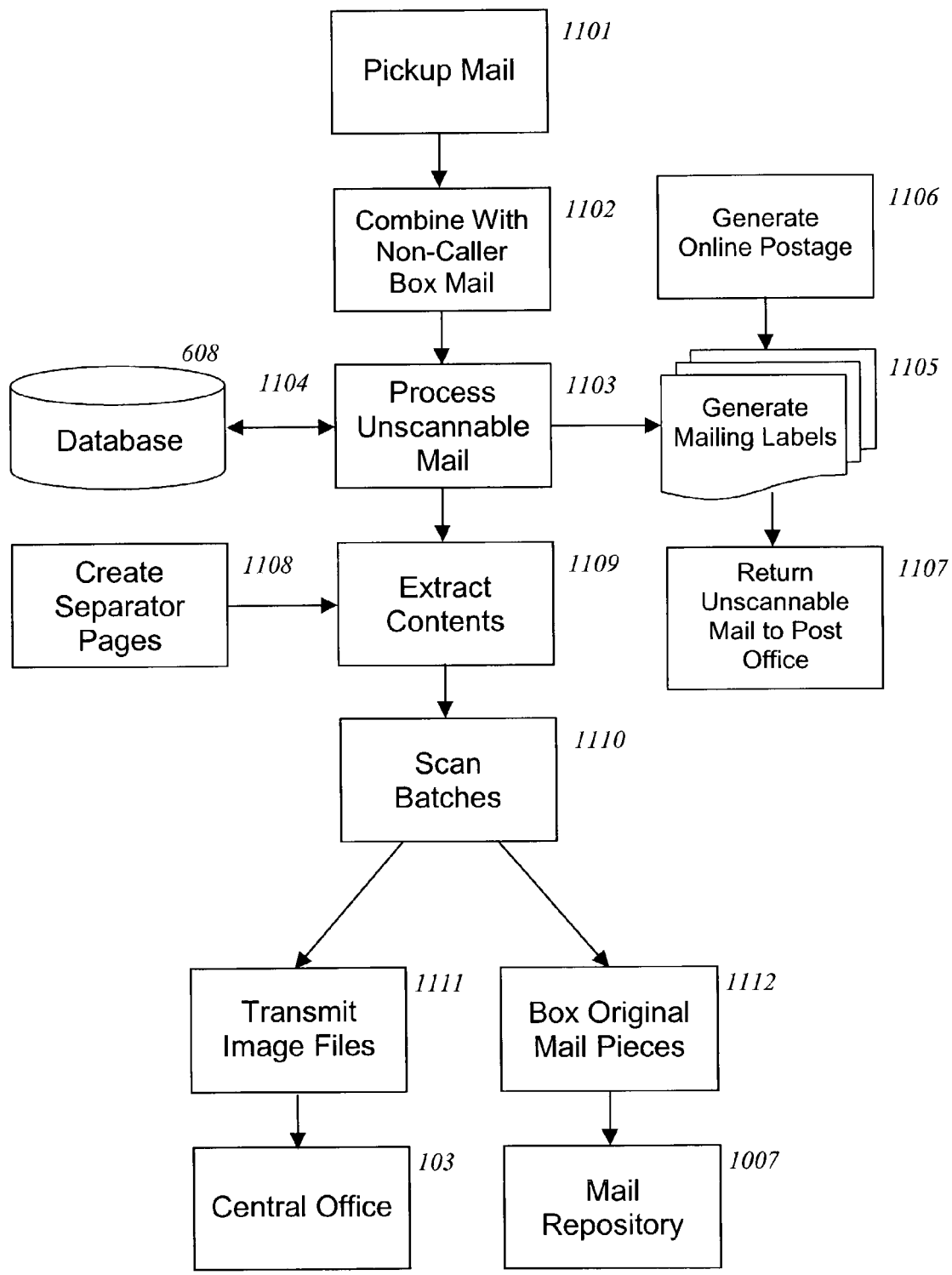
FIG. 11 SATELLITE FACILITY MAIL PROCESSING FLOW DIAGRAM

FIG. 12 SAMPLE MAIL PIECE
   SEPARATOR SHEET
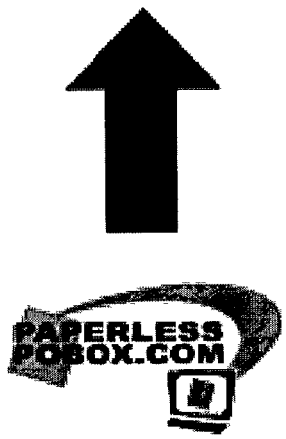
MAIL PIECE SEPARATOR SHEET
- Must be the first page for every group of pages in a mail piece -
- Next page MUST have PaperlessPOBox Address -
- Uniquely identifies each mail piece: DO NOT REUSE -
- Use END OF BATCH page at end of batch -
- Only one batch per folder -
1205 ———————————▶ ONLY USE FOR CALLER BOX 456
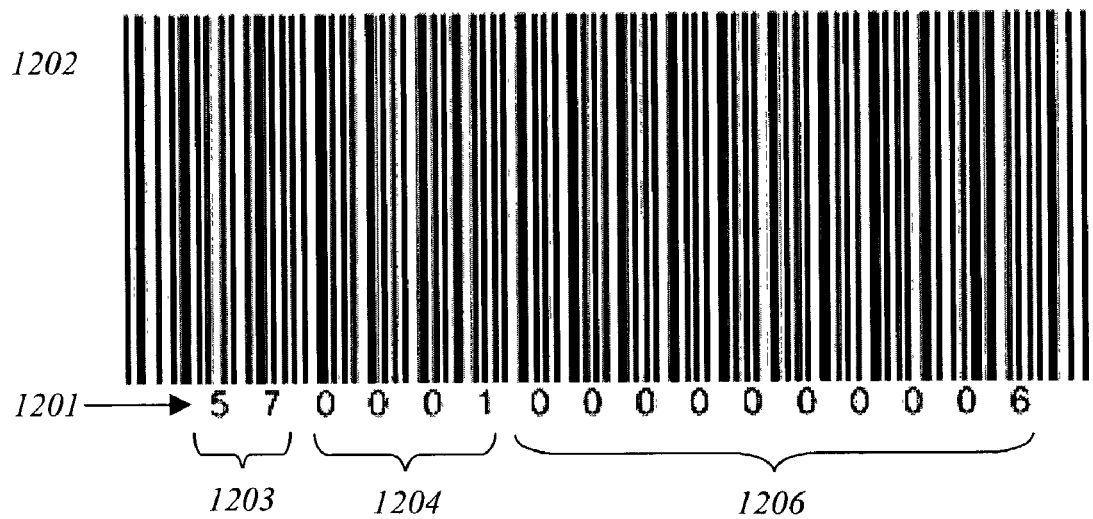

FIG. 13 SAMPLE END OF BATCH SHEET
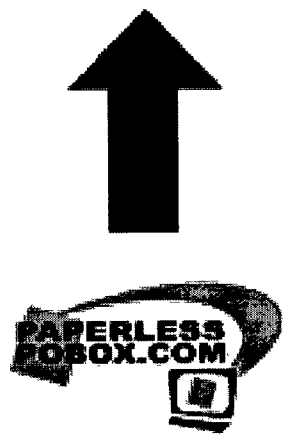
MAIL PIECE END OF BATCH SHEET
- Must be the LAST page for every group of mail pieces in a batch -
- Only one batch per folder -
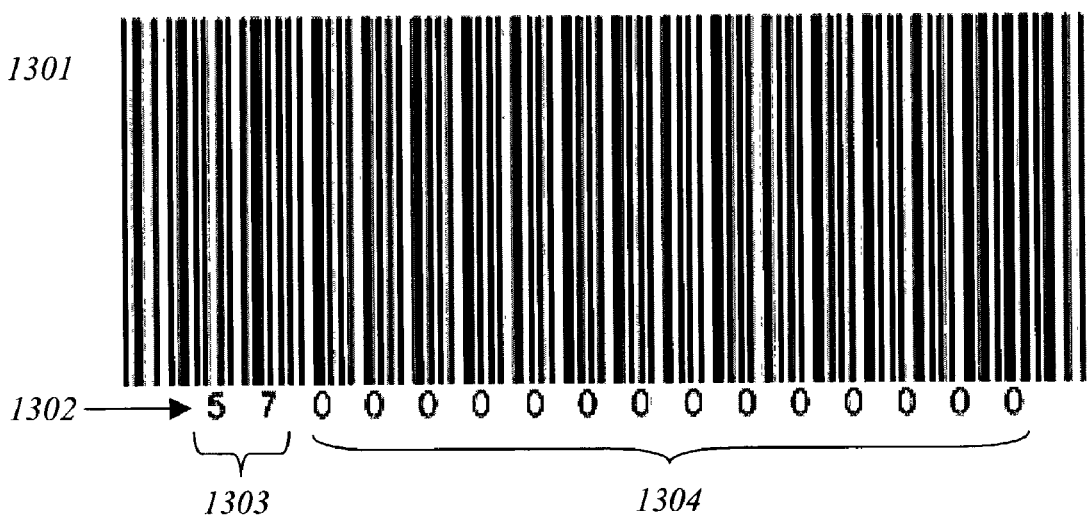

FIG. 14 SAMPLE BATCH
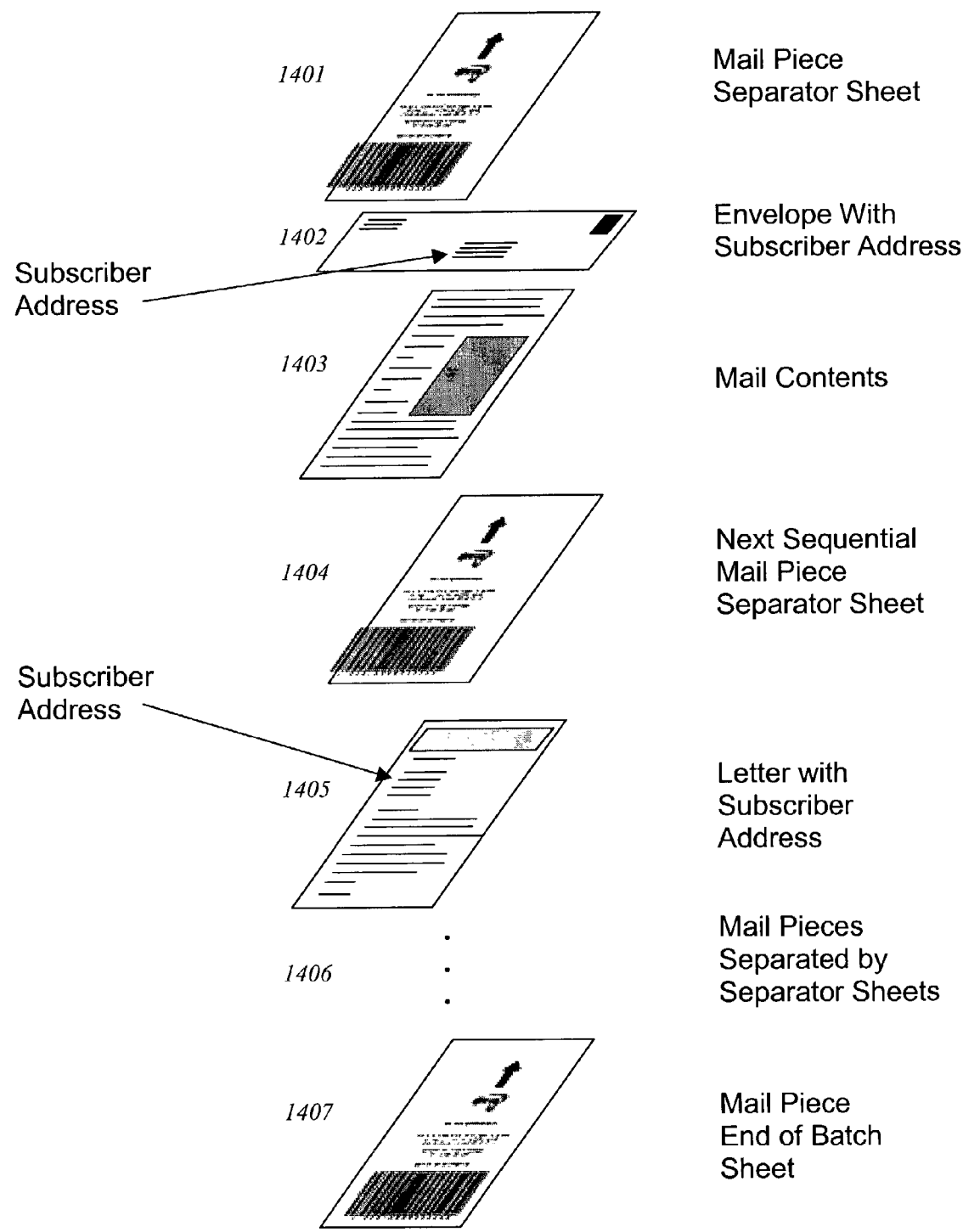

FIG. 15 SCANNING A BATCH FLOW DIAGRAM
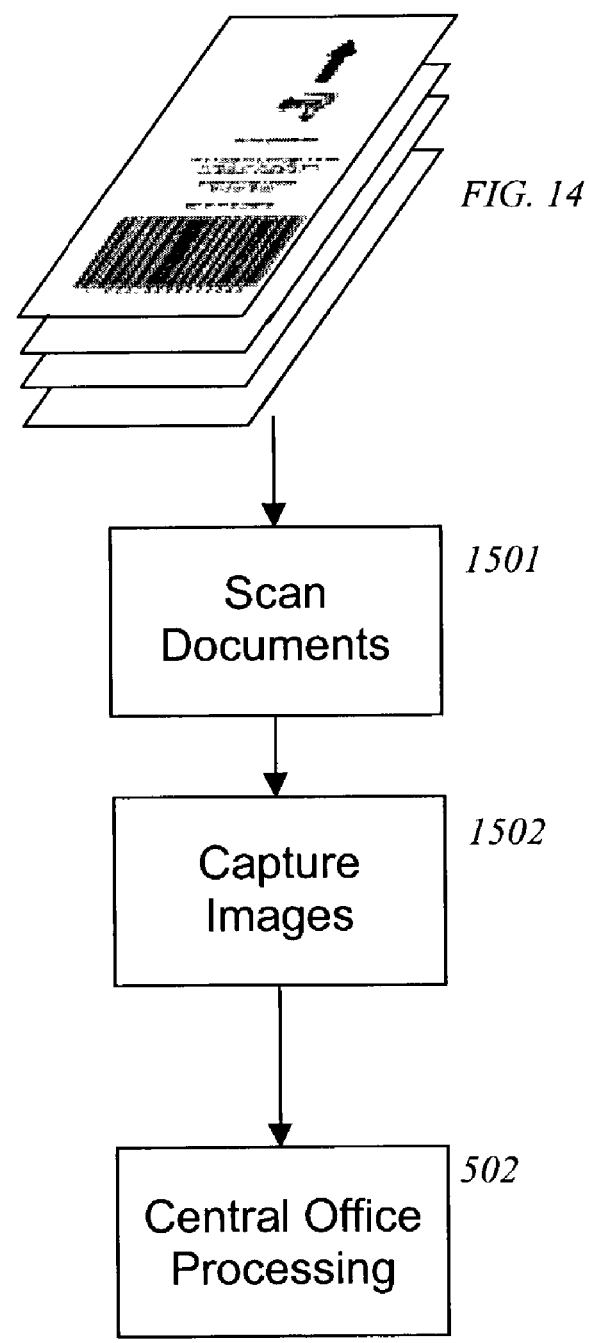

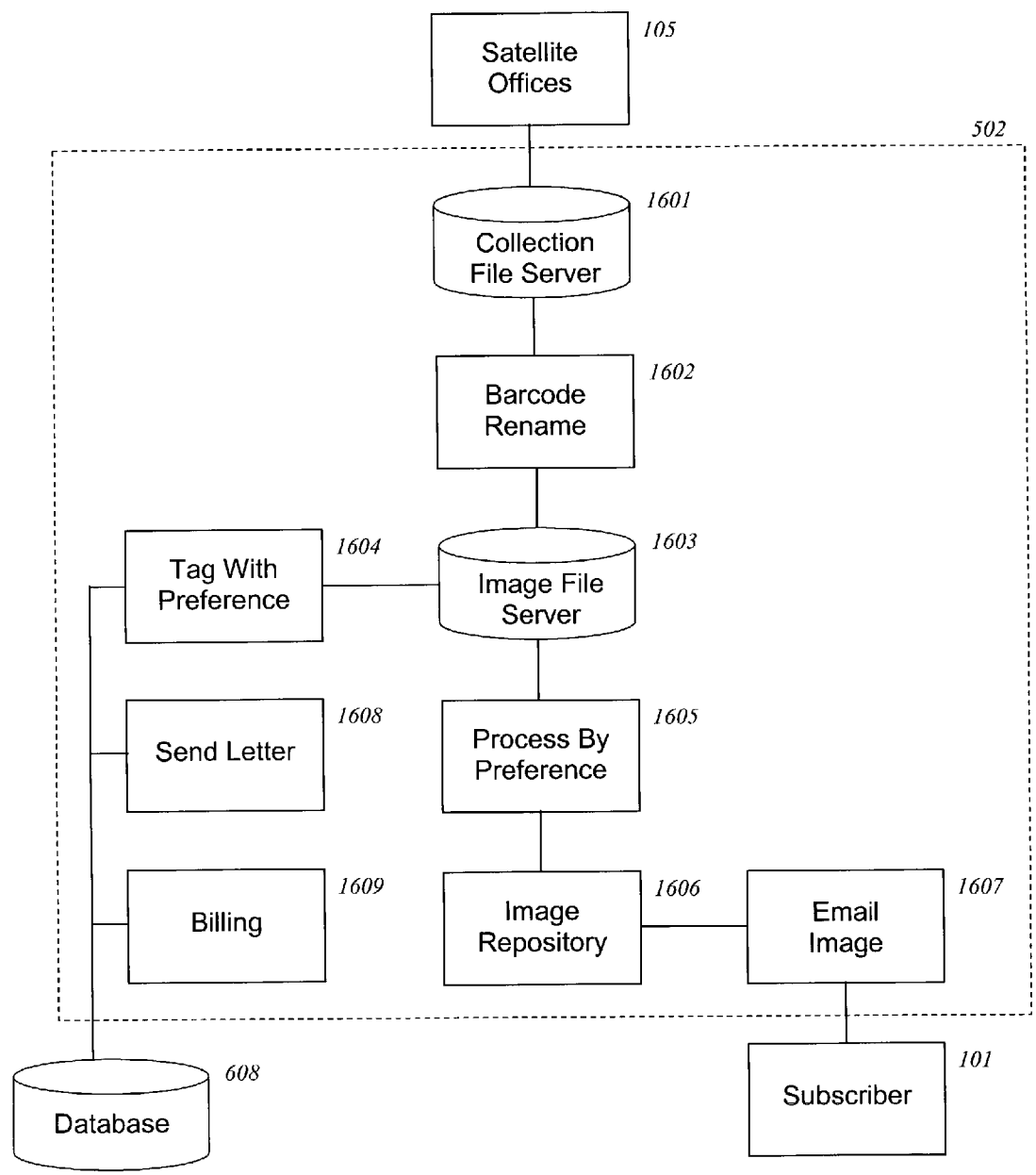
FIG. 16 CENTRAL OFFICE PROCESSING SYSTEM DIAGRAM

FIG. 17 CENTRAL OFFICE PROCESSING FLOW DIAGRAM
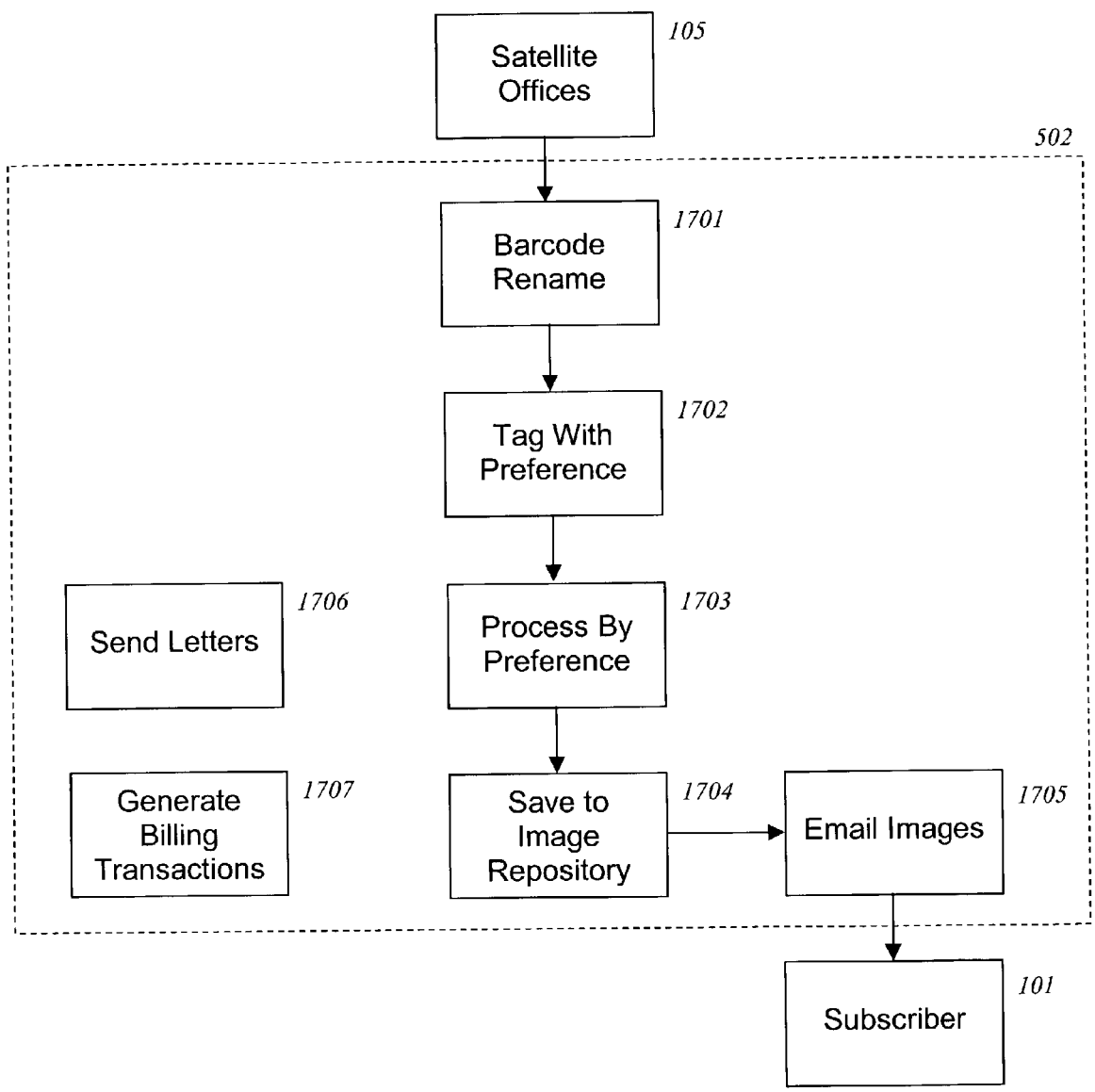

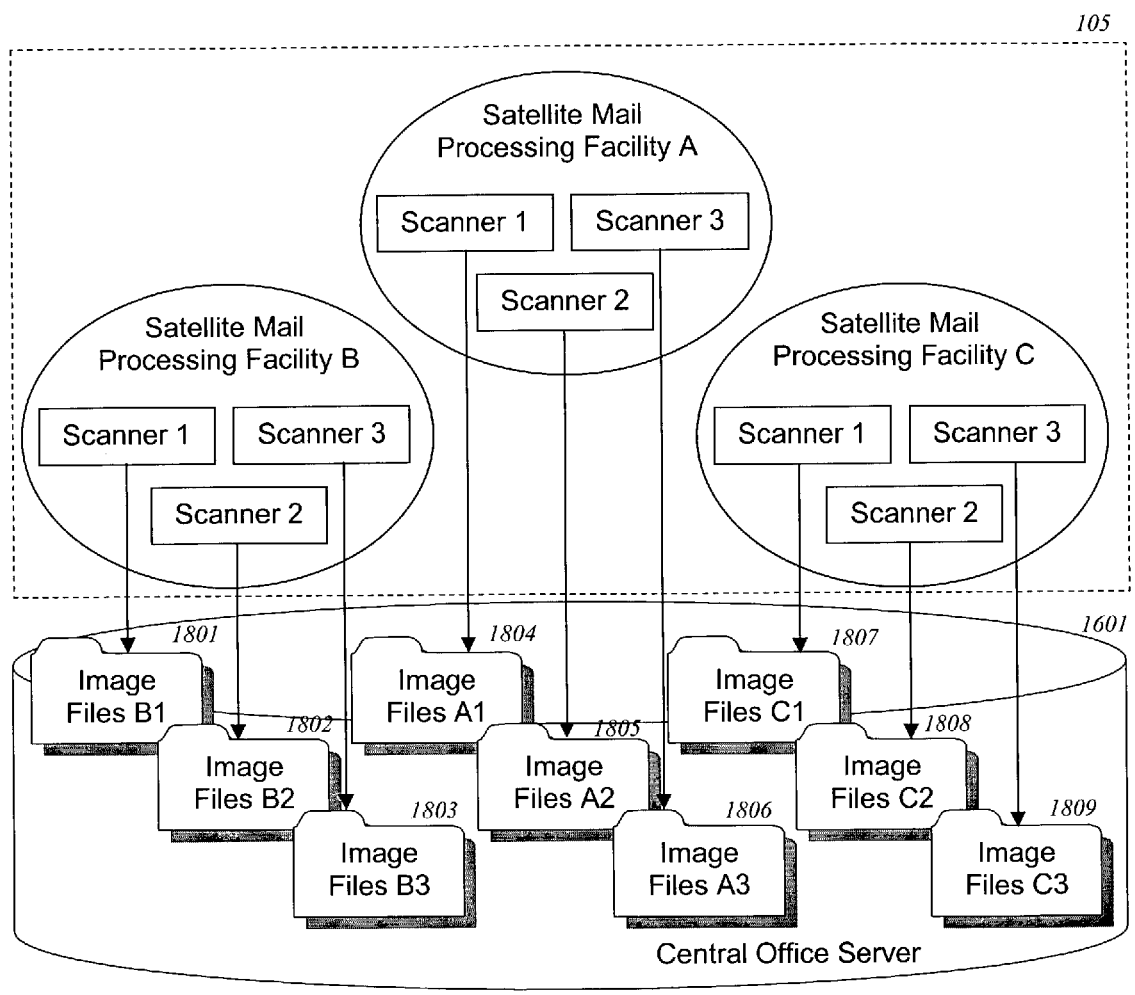
FIG. 18 SATELLITE TO CENTRAL OFFICE DETAIL

FIG. 19 BARCODE RENAME SYSTEM DIAGRAM
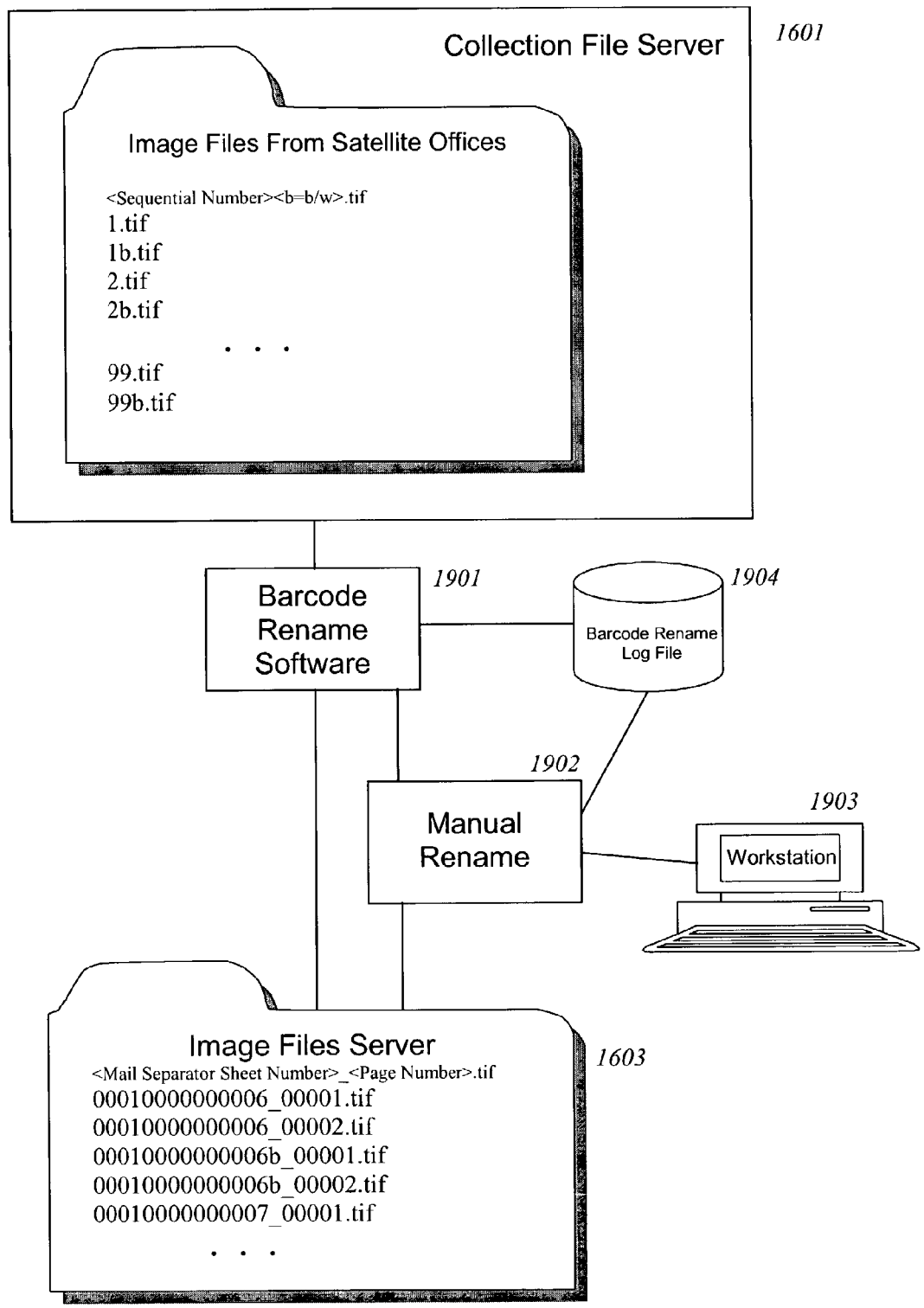

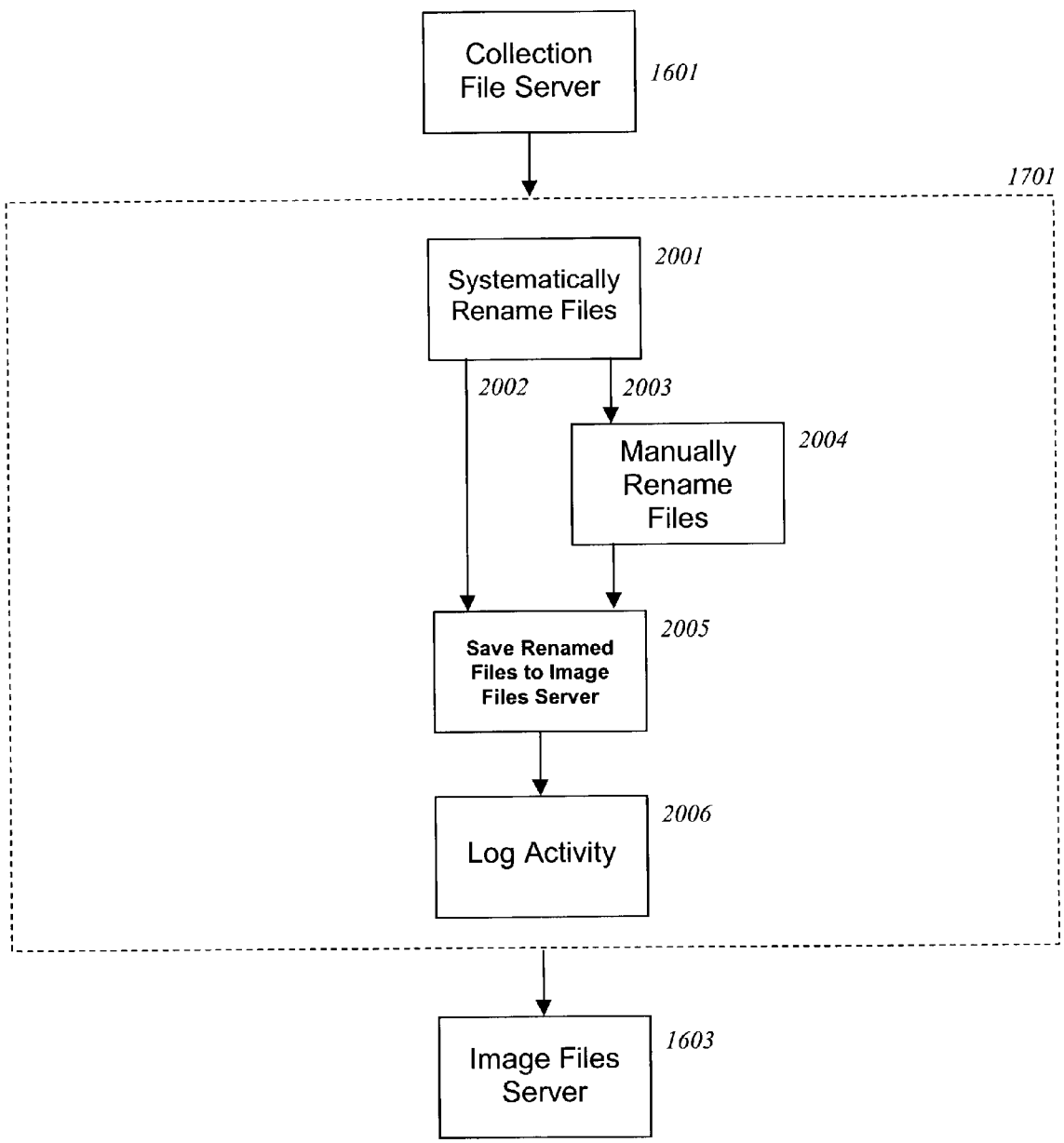
FIG. 20 BARCODE RENAME FLOW DIAGRAM

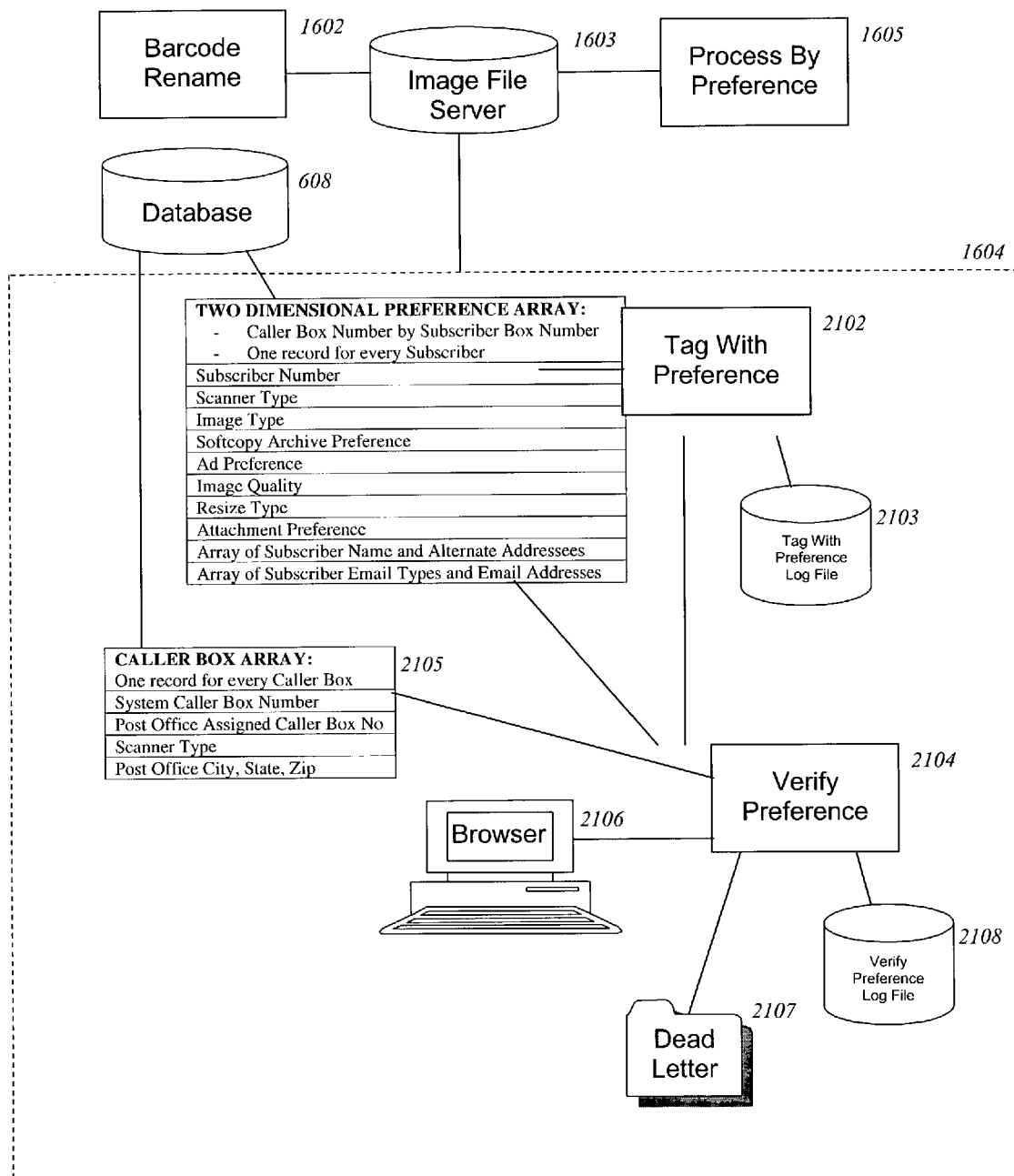
FIG. 21 TAG WITH PREFERENCE SYSTEM DIAGRAM

FIG. 22 PREFERENCE FILE DESCRIPTION

| | |
|---|---|
| 2201 | 70-Subscriber Number preceded by Prefix preceded by Paperless and followed by Caller Box. Addressee word match. No # preceding Subscriber Number. |
| 2202 | 12175 |
| 2203 | "SCANNER","IMAGE","ARCHIVE","AD","QUALITY","RESIZE","ATTACH", "ENCRYPT","FCONLY" |
| 2204 | 1,2,3,2,5,1,1,0,0 |
| 2205 | marysmith@acme.com<br>marysmith@aol.com |

FIG. 23 SUBSCRIBER MATCH CONFIDENCE LEVEL

| LEVEL | DESCRIPTION |
|---|---|
| 0 | OCR Disabled |
| 0 | 99: OCR Recognition Error |
| 0 | Error: OCR returned empty string |

Sum the following points based on text found to determine Subscriber Match Confidence Level:

| | |
|---|---|
| 20 | Valid Subscriber Number |
| 15 | If Subscriber Number preceded by Subscriber Number prefix |
| 10 | If Subscriber Number preceded by "#" sign |
| 5 | If Subscriber Number preceded by "Paperless" or "Paper" |
| 15 | If Caller Box Number from Separator Sheet follows Valid Subscriber Number |
| 5 | If Caller Box Number from Separator Sheet anywhere in text (except following Valid Subscriber Number) |
| 20 | If Valid Subscriber Number preceded by exact match with Subscriber Name, Company Name or Alternate Addressee anywhere in text (except following Valid Subscriber Number) |
| 15 | Exact match with Subscriber Name, Company Name or Alternate Addressee anywhere in text (except following Valid Subscriber Number) |
| 15 | If Valid Subscriber Number preceded by match with word from Subscriber Name, Company Name or Alternate Addressee |
| 10 | Match with word from Subscriber Name, Company Name or Alternate Addressee anywhere in text (except following Valid Subscriber Number) |

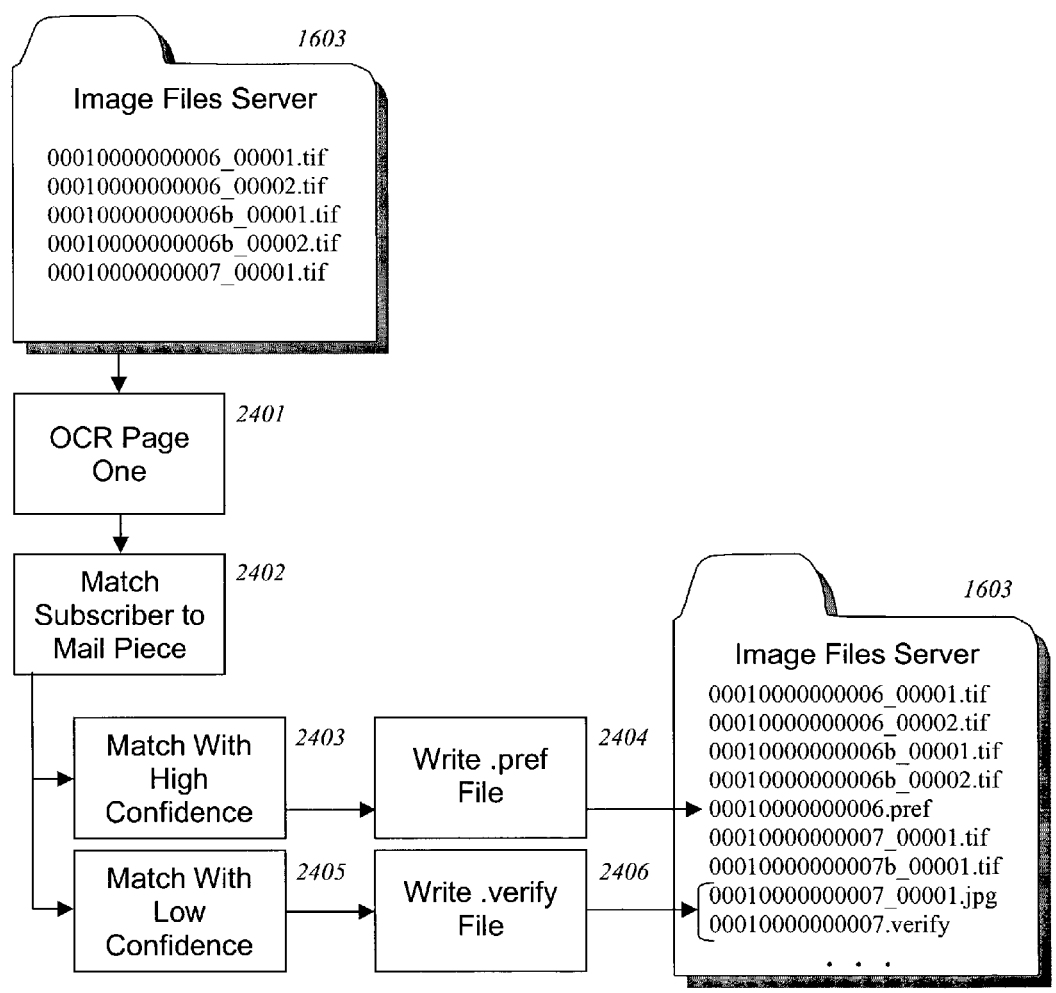
FIG. 24 TAG WITH PREFERENCE FLOW DIAGRAM

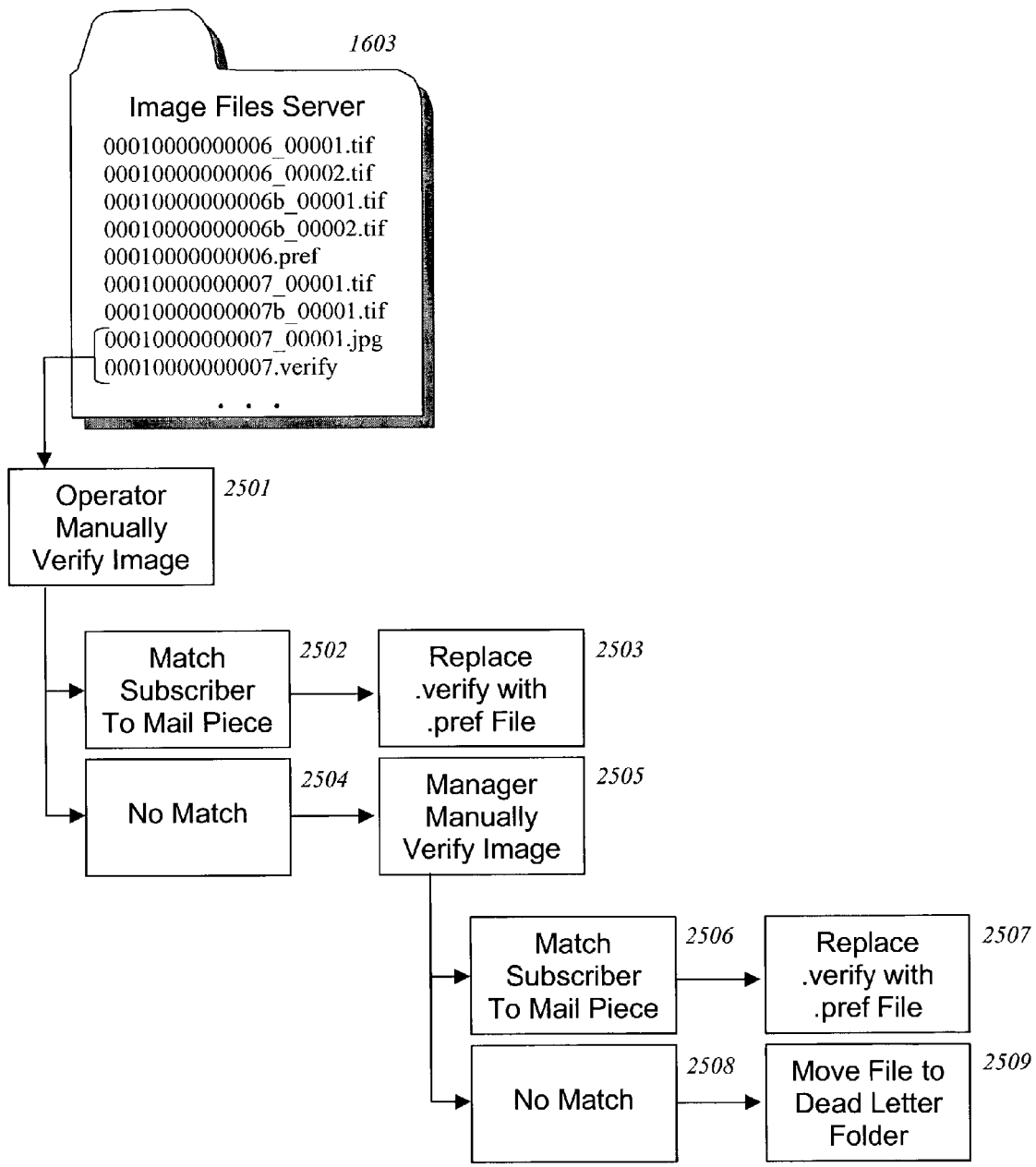
FIG. 25 VERIFY PREFERENCE FLOW DIAGRAM

FIG. 26 PREFERENCE FILE CREATION PSEUDO CODE

- Run OCR against Page One (black and white) of the document and place the resultant text into OCR Text Result string. Page One should have the Subscriber Address.
- Extract the Caller Box from the file name (it is the first four digits) to index the Caller Box dimension of the Two Dimensional Preference Array (1302). The other index is the 4 digit Subscriber Number.

```
If (Return Code from OCR Process <> 0) Then
    Write "0 <Return Code> OCR Recognition Error" to Preference File (FIG. 11)
Else
    If (IsNull(OCR Text Result) Or (OCR Text Result="")) Then
        Write "0 Error: OCR returned empty string" to Preference File (FIG. 11)
    Else
        If OCR Disabled Then
            Write "0 OCR Disabled" to Preference File (FIG. 11)
        Else
            Initialize the four fields in the Subscriber Number Array to zeros or blank
            1. Pointer to first digit of 4 digit number in OCR Text Result
            2. 4 digit number
            3. Confidence Level
            4. Confidence Level Text Description Remove any 4 digit numbers from the OCR Text Result that do not exist in the Two
            Dimensional Preference Array (1302) and set Confidence Level to 20.

For each element in the array:
                If 4 digit number is immediately preceeded by Subscriber Number Prefix in OCR Text
                    Add 15 to Confidence Level + append to Confidence Level Text Description
                If 4 digit number is preceeded by "#" sign in OCR Text Result
                    Add 10 to Confidence Level + append to Confidence Level Text Description
                If 4 digit number is preceeded by "Paperless" or "Paper" in OCR Text Result
                    Add 5 to Confidence Level + append to Confidence Level Text Description
                If Caller Box Number follows 4 digit number in OCR Text Result
                    Add 15 to Confidence Level + append to Confidence Level Text Description
                Else
                    If Caller Box Number is anywhere else in OCR Text Result
                Add 5 to Confidence Level + append to Confidence Level Text Description
                Endif
                If exact match of Subscriber Name, Company Name, or Alternate Addressee
                preceeds the 4 digit number
                    Add 20 to Confidence Level + append to Confidence Level Text Description
                Else
                If exact match of Subscriber Name, Company Name, or Alternate Addressee is
                anywhere in OCR Text Result
                Add 15 to Confidence Level + append to Confidence Level Text Description
                    Else
                        If a word from Subscriber Name, Company Name, or Alternate Addressee
                        preceeds the 4 digit number
                            Add 15 to Confidence Level + append to Confidence Level Text
                            Description
                        Else
                            If a word from Subscriber Name, Company Name, or Alternate
                            Addressee is anywhere in OCR Text Result
                                Add 10 to Confidence Level + append to Confidence Level Text
                                Desc
                        Endif
                    Endif
                Endif
            End Loop
            Query the Two Dimensional Preference Array using the 4 digit number with the highest
            Confidence Level as the Subscriber Number to write the Preference File (FIG. 11)
        Endif
    Endif
Endif
```

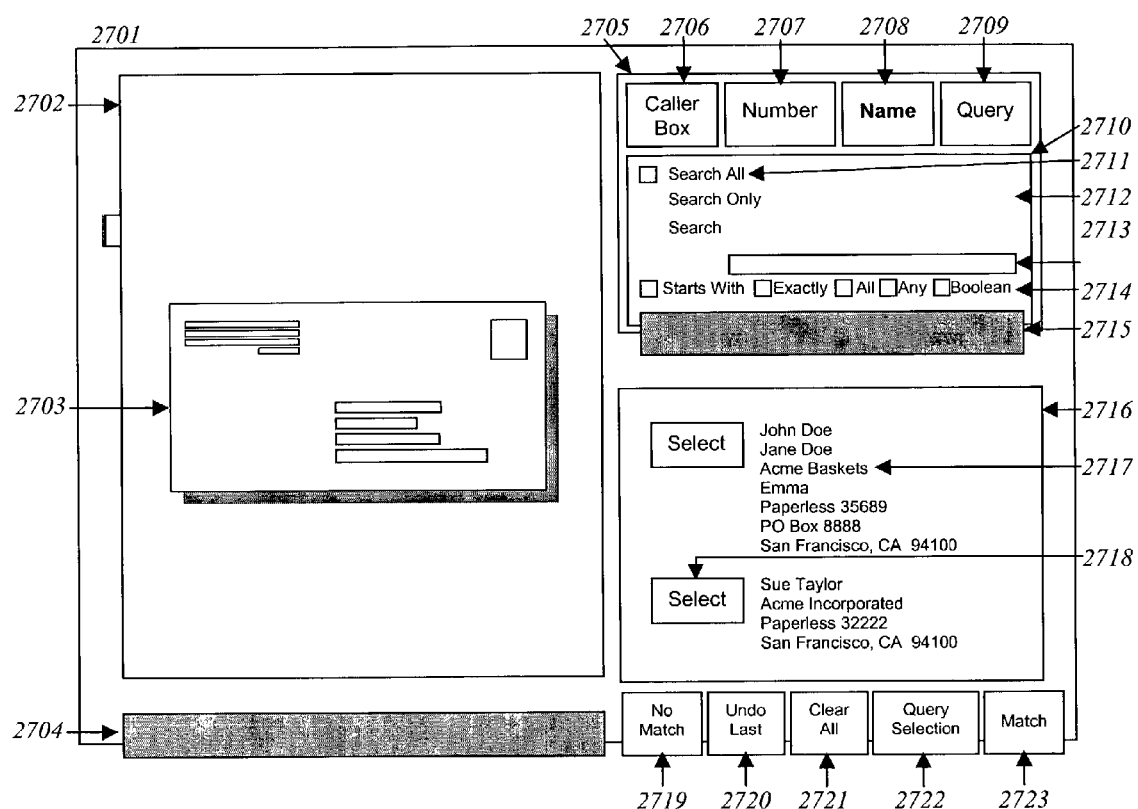
FIG. 27 VERIFY PREFERENCE USER INTERFACE

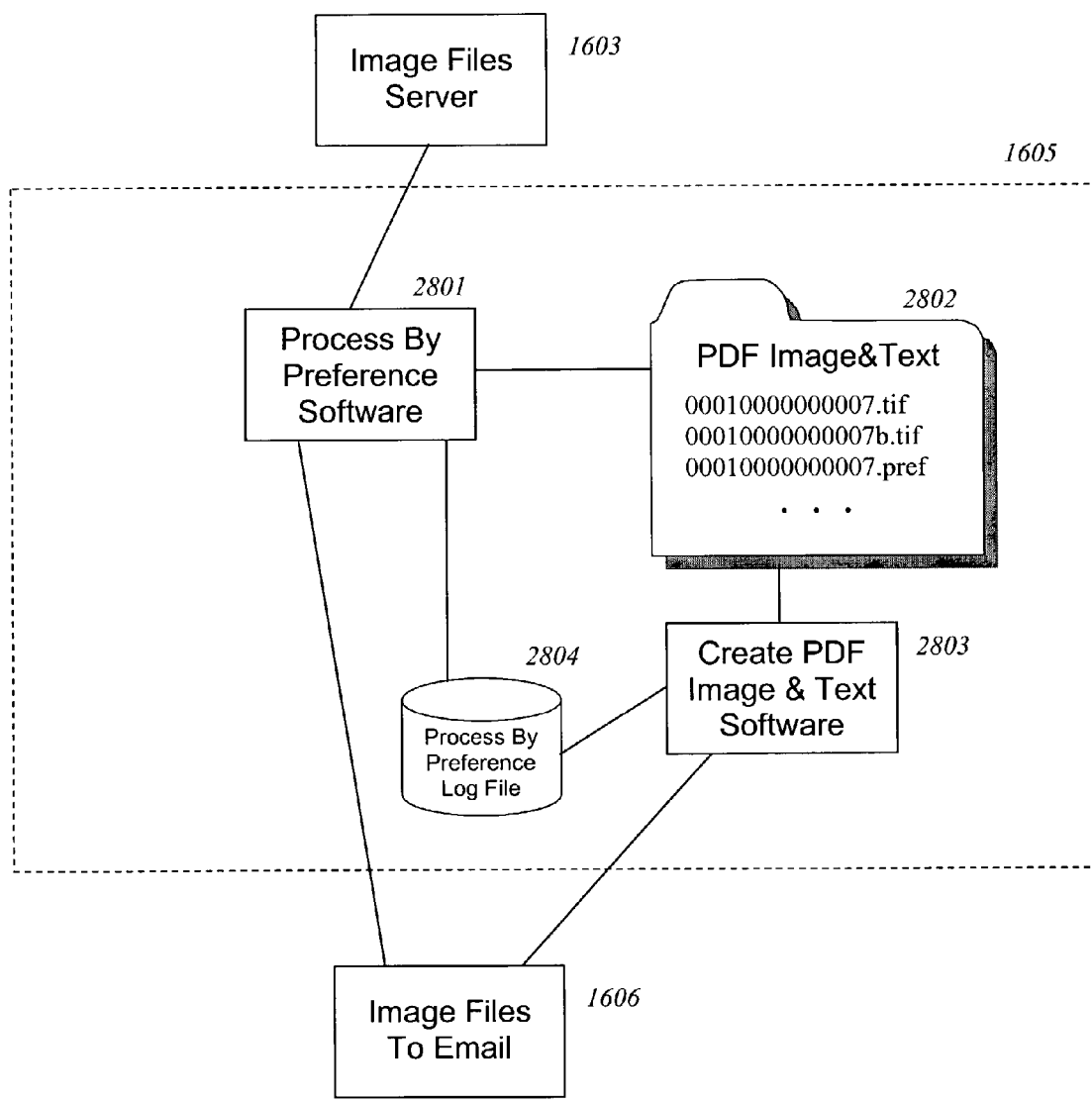
FIG. 28 PROCESS BY PREFERENCE SYSTEM DIAGRAM

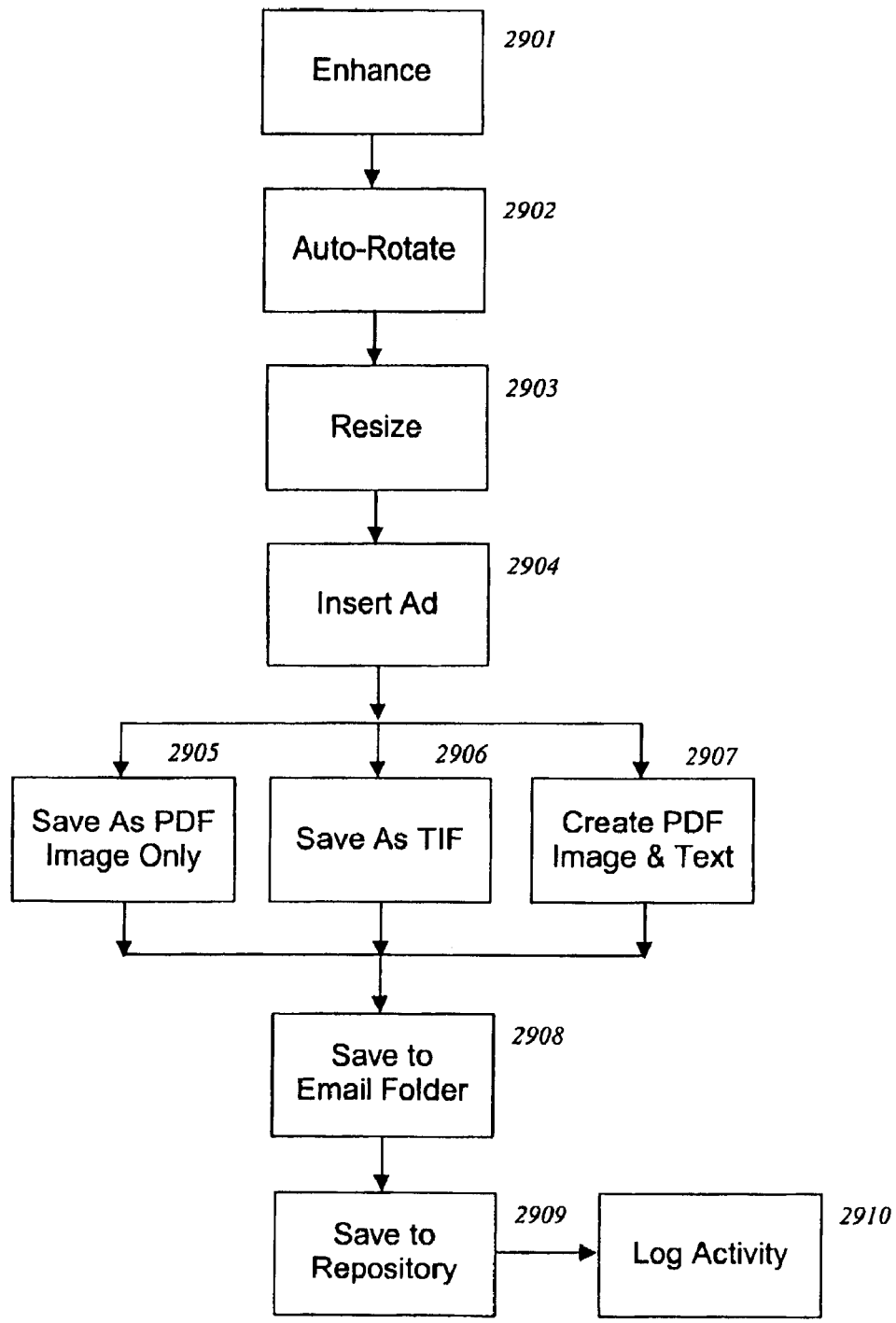
FIG. 29 PROCESS BY PREFERENCE FLOW DIAGRAM

FIG. 30 EMAIL IMAGE SYSTEM DIAGRAM
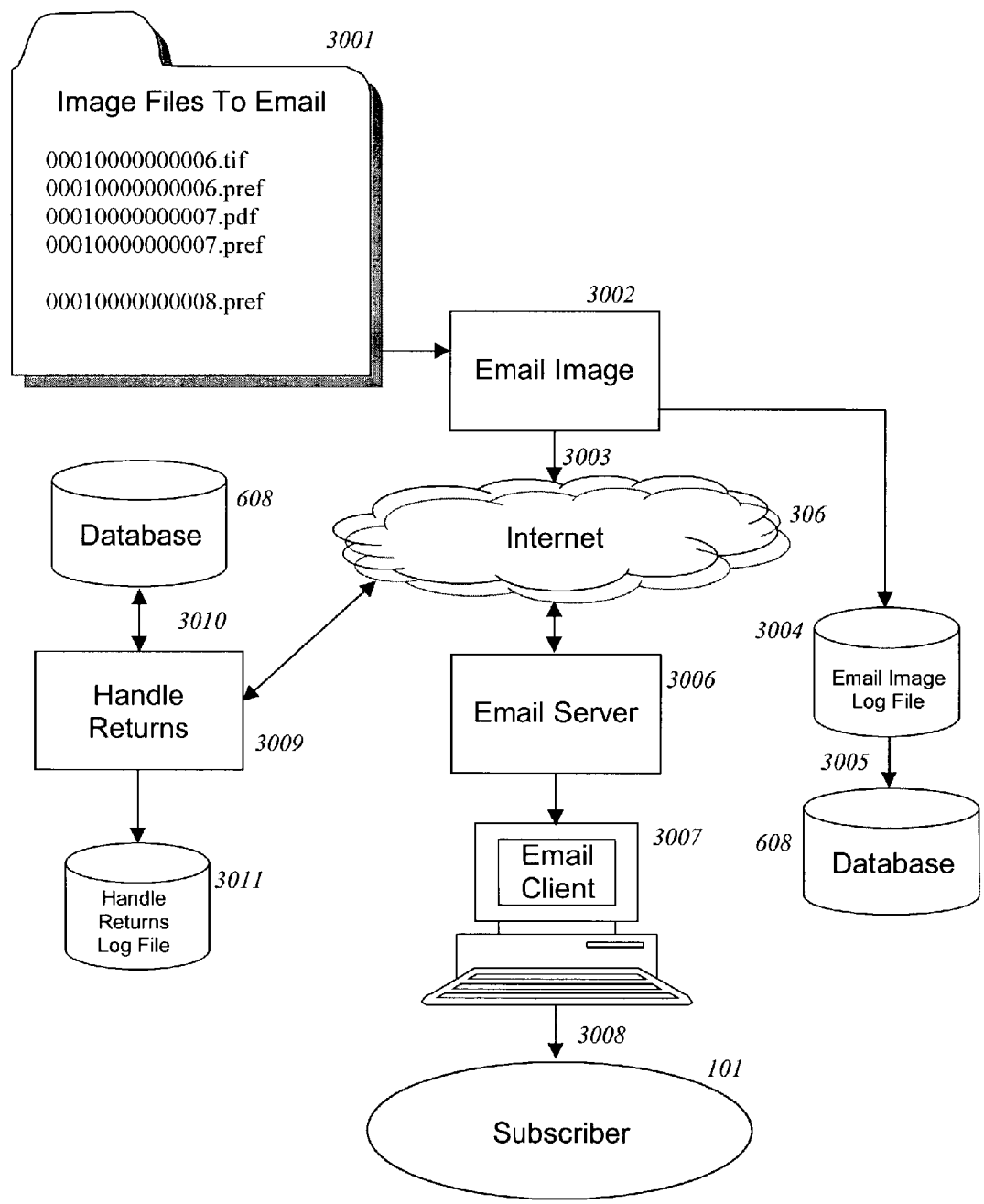

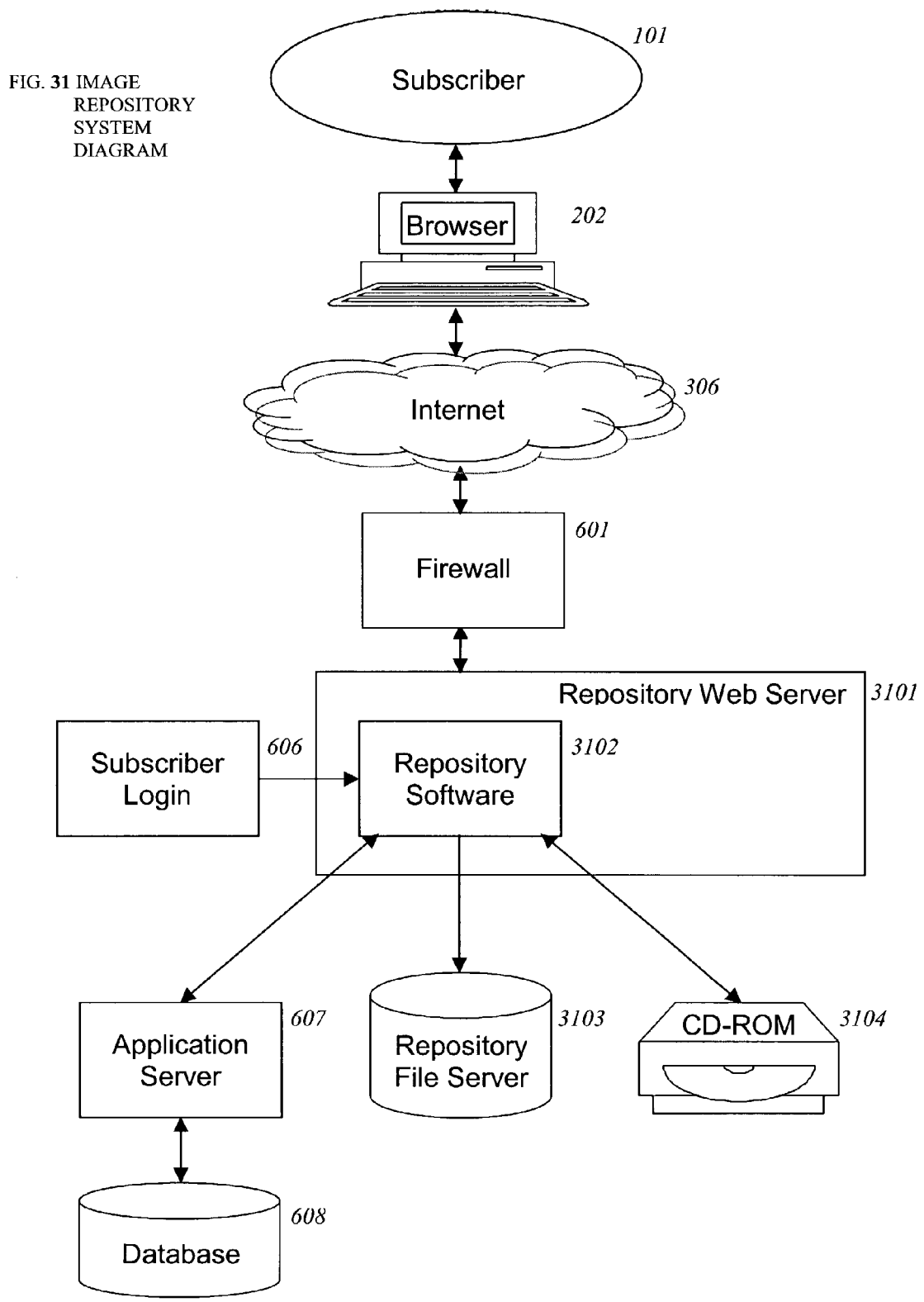
FIG. 31 IMAGE REPOSITORY SYSTEM DIAGRAM

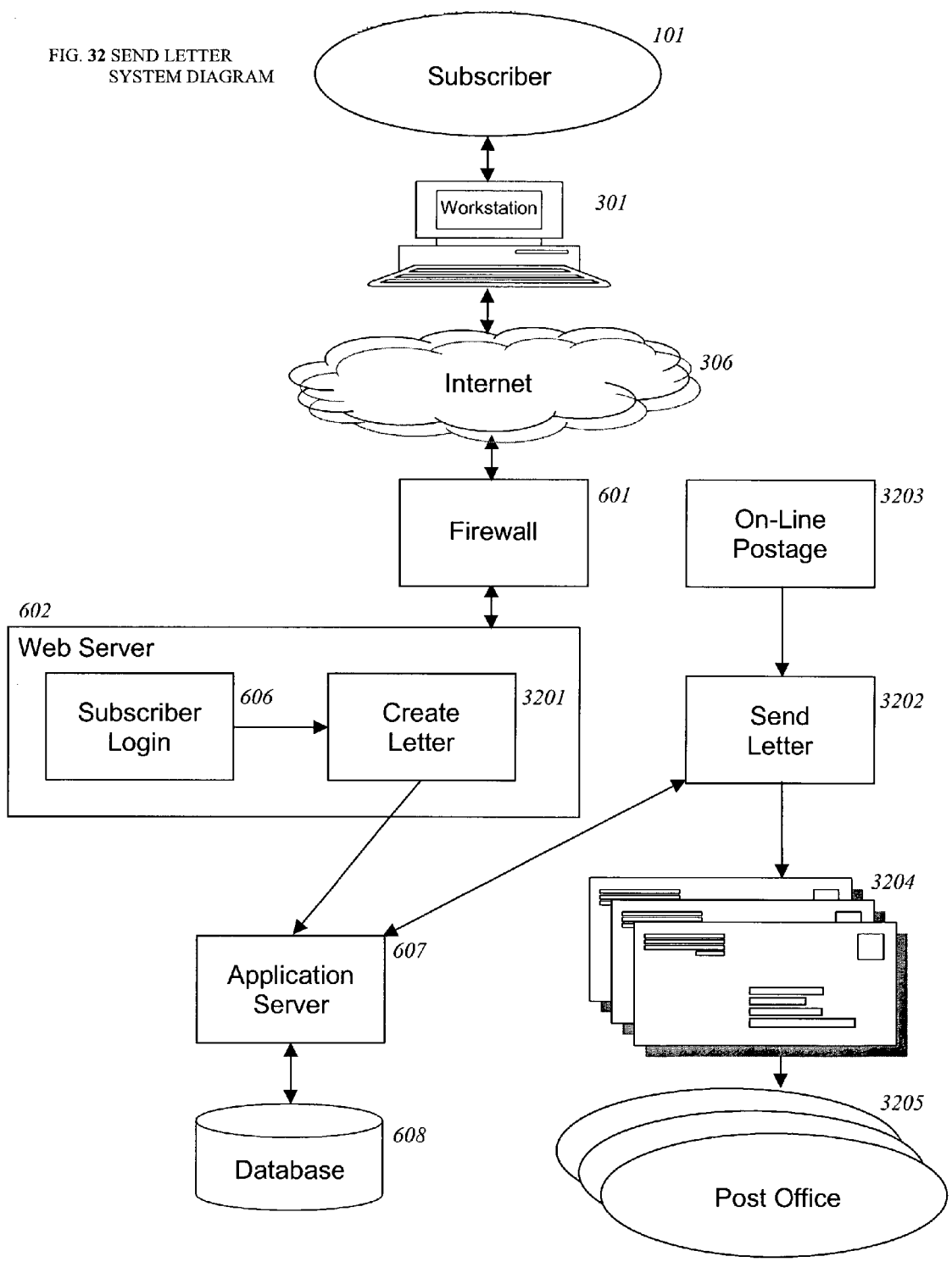
FIG. 32 SEND LETTER SYSTEM DIAGRAM

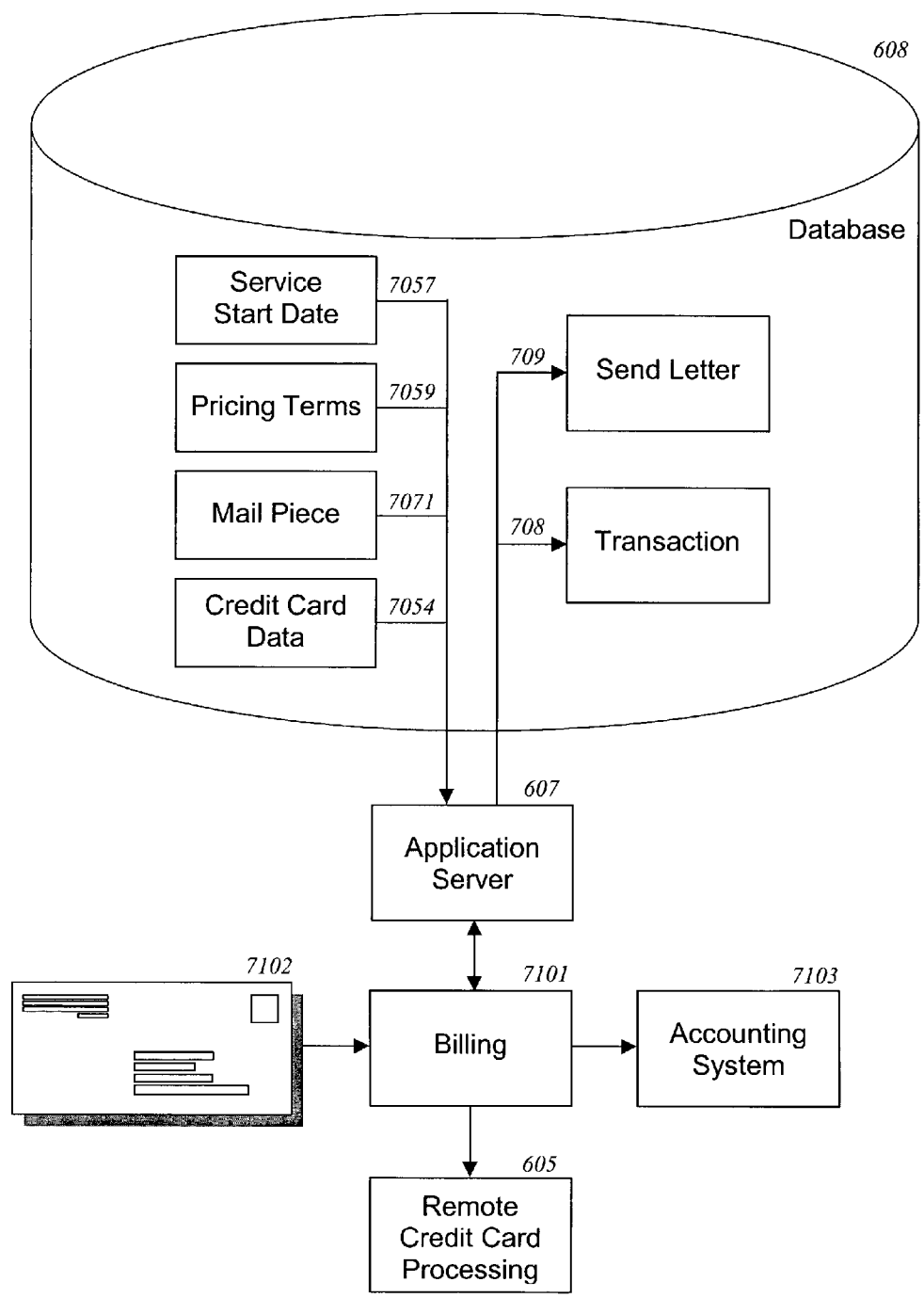
FIG. 33 BILLING SYSTEM DIAGRAM

METHOD AND SYSTEM FOR POSTAL SERVICE MAIL DELIVERY VIA ELECTRONIC MAIL

RELATED APPLICATIONS

This application claims priority to Provisional Application Ser. No. 60/317,930, filed on Sep. 10, 2001 under 35 U.S.C. §119(e). The content of the Provisional Application Ser. No. 60/317,930 is hereby incorporated by reference.

BACKGROUND OF THE INVENTION

1. Field of the Invention

The present invention relates to a method and system for delivering postal service mail via electronic mail systems (e-mail). More particularly, the present invention relates to a method and system for converting large quantities of postal service mail into computerized image files then routing those files to the designated recipients via electronic mail (e-mail).

2. Description of the Related Art

Two popular forms of communication are postal service mail and electronic mail (e-mail).

King Sargon of Babylon established the first regular postal service in about 3800 B.C. Paper and parchment had not yet been invented so the king's letters were cut on slabs of clay which were baked then marked with a royal seal. Specimens of these ancient letters are on display in the Louvre in Paris. Later, Egyptian postmen were so highly regarded that they are depicted on a royal tomb dating about 1500 B.C. The Greek Herodotus wrote the slogan "Neither rain, nor snow, nor heat, nor gloom of night stays these couriers from the swift completion of their appointed rounds" in the fifth century B.C. The Roman postal system continued until the Dark Ages. Then, during the Renaissance regular postal systems were created in Europe. Benjamin Franklin was named the first Postmaster General for the United States in 1775. Two centuries later, over 200 billion mail pieces are delivered every year in the U.S.

Ray Tomlinson invented email in 1972 while working at Bolt Beranek and Newman (BBN), a company that had a government contract to work on the Arpanet, the precursor of the Internet. U.S. Email access has grown from 8 million users in 1991 to 108 million users in 1999. In 1999, office workers exchanged 25.2 billion messages daily.

Most electronic mail systems are composed of two components: client and server. Email client programs run locally on the user's computer and are used to compose, store, send and receive messages. Examples of email client software brands include Microsoft Outlook, ccMail, Netscape Messenger, and Eudora. Email client software sends email to and receives email from their domain's email server. Email also permits attachments such as image files or text files to be included with the email message.

Email servers are more powerful computers that manage mail by delivering mail to their clients, routing mail to and from other servers via the internet, and by generating error messages if necessary. Email servers manage mail for their "domain". The client name is specified before the @ sign of the email address, the domain name is specified after the @ sign. For sue@aol.com, Sue is the client and aol.com is the domain.

While email may have many advantages over postal service mail, postal service mail remains a prolific means of communication with its advantages. Email is generally delivered within minutes while postal service mail usually takes days to deliver. It is easier to forward email and broadcast email copies to multiple users. Most email accounts may be accessed from anywhere in the world via the internet—making it especially convenient for business travellers. Email is less expensive to send and quicker to compose. Stored emails are easy to locate via globally-accessable, text-searchable repositories while letters stored in file cabinets can be difficult to search through. Nevertheless, postal service mail continues to grow: total U.S. mail volume increased 3.1% from 1999 to 2000, to 207.9 million pieces. Furthermore, more time is usually spent insuring that every piece of communication is clear and unambiguous when writing a paper document. Postal mail can often be more personal than an email and may be required for more formal communication such as between attorneys.

BACKGROUND OF THE INVENTION

Briefly, in one aspect of the present invention, a system and method for processing mail includes receiving a mail item, the mail item having recipient address information and one or more pages enclosed in the mail item, and scanning the mail item including the recipient address information and the enclosed one or more pages into an image file. A subscriber is identified from the recipient address information in the image file. An e-mail message is transmitted to the identified subscriber, the e-mail message indicating the reception of the mail item.

Various embodiments provide a system and method for matching text of a converted image of recipient address information to a subscriber from a database of subscriber information; calculating a confidence level based on the match of the text to the subscriber; and comparing a confidence level to a threshold, wherein the e-mail message is transmitted to the subscriber matching the text if the confidence level exceed the threshold.

BRIEF DESCRIPTION OF THE DRAWINGS

The method and system is described with reference to the accompanying drawings with the leftmost number(s) of a reference number identifying the drawing in which it first appears. These drawings illustrate the preferred implmentation of the invention. Combined with the detailed description these drawings serve to explain the principals of the invention.

FIG. 1 is a High Level System Diagram showing the main components of the method and system for postal service mail delivery via electronic mail consistent with the present invention.

FIG. 2 is a High Level Flow Diagram showing the main processes of the present invention.

FIG. 3 is a Subscriber System Diagram showing the main elements of the Subscriber component consistent with the present invention.

FIG. 4 is a Subscriber Flow Diagram showing the main processes of the Subscriber component of the present invention.

FIG. 5 is a High Level Central Office System Diagram showing the main elements of the Central Office component consistent with the present invention.

FIG. 6 is a Central Office Data Management System Diagram showing the main elements of the Central Office Data Management component consistent with the present invention.

FIG. 7A is a Entity-Relationship Diagram of the Database component consistent with the present invention.

FIG. 7B is a table with Database Detail corresponding to the components of the FIG. 7A Entity-Relationship Diagram consistent with the present invention.

FIG. 8 describes the components of a Subscriber Address used to receive mail.

FIG. 9 is a Central Office Data Management Flow Diagram showing the main processes of the Central Office Data Management component of the present invention.

FIG. 10 is a Satellite Office System Diagram showing the main elements of the Satellite Office component consistent with the present invention.

FIG. 11 is a Satellite Office Flow Diagram showing the main processes of the Central Office Data Management component of the present invention.

FIG. 12 is a sample Mail Piece Separator Sheet consistent with the present invention.

FIG. 13 is a sample Mail Piece End of Batch Sheet consistent with the present invention.

FIG. 14 is a representation of a Sample Batch of mail pieces ready to be scanned consistent with the present invention.

FIG. 15 is a flow diagram for Scanning a Batch of mail pieces consistent with the present invention.

FIG. 16 is a Central Office Processing System Diagram showing the main elements of the Central Office Processing component consistent with the present invention.

FIG. 17 is a Central Office Processing Flow Diagram showing the main processes of the Central Office Processing component of the present invention.

FIG. 18 is a Satellite to Central Office Detail system diagram showing the connection between the two offices consistent with the present invention.

FIG. 19 is a Central Office Barcode Rename System Diagram showing the main elements of the Central Office Barcode Rename component consistent with the present invention.

FIG. 20 is a Central Office Barcode Rename Flow Diagram showing the main processes of the Barcode Rename component of the present invention.

FIG. 21 is a Tag With Preference System Diagram showing the main elements of the Tag With Preference component consistent with the present invention.

FIG. 22 describes the contents of the Preference File consistent with the present invention.

FIG. 23 lists the Subscriber Match Confidence Level consistent with the present invention.

FIG. 24 is a Tag With Preference Flow Diagram showing the main processes of the Tag With Preference component of the present invention.

FIG. 25 is a Verify Preference Flow Diagram showing the main processes of the Verify Preference component of the present invention.

FIG. 26 lists the pseudo code for the Preference File creation process consistent with the present invention.

FIG. 27 details the user interface of the Verify Preference software consistent with the present invention.

FIG. 28 is a Process By Preference System Diagram showing the main elements of the Process By Preference component consistent with the present invention.

FIG. 29 is a Process By Preference Flow Diagram showing the main processes of the Process By Preference component of the present invention.

FIG. 30 is a Email Image System Diagram showing the main elements of the Email Image component consistent with the present invention.

FIG. 31 is a Image Repository System Diagram showing the main elements of the Image Repository component consistent with the present invention.

FIG. 32 is a Send Letter System Diagram showing the main elements of the Send Letter component consistent with the present invention.

FIG. 33 is a Billing System Diagram showing the main elements of the Billing component consistent with the present invention.

DETAILED DESCRIPTION OF THE PREFERRED EMBODIMENTS

A method and system consistent with the present invention provides for postal service mail delivery via electronic mail. First, the subscriber subscribes to at least one conventional email system and is provided with one or more email addresses.

The service consists of three main elements: Subscriber 101, Central Office 103, and Satellite Office(s) 105. Subscribers connect to the Central Office via the Internet 102 while Central Offices connect to Satellite Offices via dedicated bandwidth 104. Satellite Offices are located in various cities adjacent to the main Post Office 107. Bonded couriers deliver mail between 106 the Satellite Offices 105 and their corresponding Post Offices 107. To first subscribe to the service, a Subscriber Enters Preference Data (step 201) to establish an account Stored on a Central Office Database (step 202). Once a Subscriber is established, mail arrives at the Post Office 107 and is Picked Up by bonded courier (step 204) and delivered to the Satellite Office for Processing (step 204). Image files of the mail are transmitted to the Central Office for Additional Processing (step 205) and then forwarded to the Subscriber via Email (step 206).

The Subscriber 101 component of the service involves five main steps. First the Subscriber establishes service (step 401) by using the browser (popular brands include Microsoft Explorer or Netscape Navigator) on their Workstation 301 to the URL for the web site for the service 302. A Workstation 301 is connected 305 to the Internet 306 by a Router and/or switch 303 installed on their network. The Central Office 103 interfaces 307 with the Subscriber 101 via the Internet 306. Information about the service and contact addresses for questions are provided. Once all needed information is provided, the Central Office systems respond to the Subscriber with a Subscriber Address FIG. 8 (step 402) that the Subscriber will give out to everyone they want to use the service (step 403). Once mail is received at the Subscriber Address it is processed by the Satellite and Central offices. Then image files of the Subscriber's postal mail are Emailed to the Subscriber by the Central Office (step 404). The Email Server 304 receives the Email and Routes It to the Subscriber (step 405).

The Central Office is composed of two main components: Data Management 501 and Processing 502.

Using the Browser on the Subscriber's Workstation 301 (popular brands include Microsoft Explorer or Netscape Navigator), the Subscriber may view content (pages) from the service's web site (step 901) over the Internet 306, or other public network. A Web Server 602 includes software (popular brands include iPlanet, Apache, or Microsoft Internet Information Server) for serving content to the Browser (step 902) using, for example, Java Servlets and HTML. For security reasons, a Firewall 601 (popular brands include Cisco's PIX, Checkpoint, and Watchguard) permits access from the Internet 306 only to specified ports on the Web Server 602. The Web Server 602 facilitates thousands of simultaneous users. Depending on the number of users, multiple Web Servers 602 may be deployed. Redundant Web Servers 602 also increase reliability by providing backup should a server go down. A Web Site on the Web Server 602 is divided into three parts:

Service Description 603; Subscriber Sign Up 604; and Subscriber Login 606 and is accessible at all times.

The Service Description 603 provides a complete overview of the service. It contains a step-by-step explanation on how the service works, details customer benefits, has a chart comparing the different service options, and answers frequently asked questions. Video streaming software (popular brands include Apple Quicktime, Real, and Microsoft Windows Media) is used to show a video detailing the system. The privacy policy and means of contacting customer support are also detailed.

All Subscribers of the basic service may completely sign up (step 401) and receive their Subscriber Address FIG. 8 on-line (step 402) by filling out an online form of the Subscriber Sign Up 604. For security reasons, all transactions via the Subscriber Sign Up 604 are preferably secure employing Secure Socket Layer Encryption. Some subscribers who need customized processing (such as change of address processing) or software integration (with software such as customer relationship management, integrated messaging, or sales force automation systems) may need additional assistance from a dedicated account representative and experienced software integrator. The Web Server 602 interfaces with an Application Server 607 (popular brands include BEA WebLogic and IBM WebSphere). Enterprise Java Beans deployed on the Application Server 607 to enter Subscriber data from the forms into the Database 608 (step 903) (popular brands include Oracle and IBM DB2). The Application Server 607 facilitates thousands of simultaneous connections to the Database 608. Depending on the number of users, multiple (clusters) of Application Servers 607 and Databases 608 may be deployed. Redundant servers also increase reliability by providing a backup should a server go down. For security reasons, a Firewall 601 inhibits any type of access from the Internet 306 to the Application Server 208 or the Database 608. With the Firewall 601 in place, only the Web Server 602 may connect to the Application Server 607 and only the Application Server 607 may connect to the Database 608.

Once service is established, Subscribers may use the Subscriber Login 606 for password-protected access to all their database information (steps 904 and 905). For security reasons, all transactions via the Subscriber Login 606 are preferably secure, such as with Secure Socket Layer Encryption.

Central Office Processing 502 entails Database 608 access (step 906) to query Subscriber Preferences when processing image files (for example, does the Subscriber want color, black and white, or greyscale images?). Periodically, data (such as records for subscribers who have stopped service) will be transferred to an Archive 609 (step 907). Detail records over a year old for active subscribers may also be archived and replaced with a summary record. Archiving minimizes the size of the Database 608 to maximize its performance.

When establishing service (step 401) the Subscriber 101 specifies a list of Subscriber Preferences 706 using a web-based form. This data is stored in a Database 608 and the user is assigned a Caller Box number 7021 based on selected Subscriber Preferences 706 and a Subscriber Box Number 7031 unique to the Caller Box Number 7021. Now the user has signed up for the service and becomes a Subscriber 101. The Subscriber 101 is then given a Subscriber Address (FIG. 8) composed of the Subscriber Box Number 7031, the Caller Box Number 7021, and a City, State, Zip of the post office 7011. Alternatively, a unique zip code might be established at the main post office. In this case the Caller Box 7021 is no longer required and the Subscriber Box Number 7031 is the Post Office Box Number.

Credit card transactions are preferably processed via a secure connection to a remote Credit Card Processing provider 605. With a secure connection, all credit card data is encrypted and stored by the Credit Card Processing provider 605. Only a pointer to the data is stored in the Database 7054.

FIG. 7A illustrates the Entity-Relationship Diagram for the Database component of the system. FIG. 7B is a table with Database Detail corresponding to the components of the FIG. 3A Entity-Relationship Diagram. The following description references both of these figures. The Satellite Mail Processing Facility is preferably located adjacent to a main post office for the different cities where service is offered. Information about the post office such as street address, city, state, and zip code is stored in the Database 209 under Post Office 701. Each Post Office 701 may have one or more Caller Boxes 702. Caller Boxes 702 (a.k.a. Caller Service) are a delivery service provided by the Post Office Entity 701 for a fee. Like a Post Office Box, the Caller Box 702 has a Post Office Box Number (Caller Box Number) 7021 address assigned by the Post Office 701. There is preferably no physical box. Instead, mail can be accumulated for the Caller Box 702 in bins by postal service employees, allowing for large volumes of mail to be received by the Caller Box 702. Like post office boxes, mail is typically delivered to the Caller Boxes 702 before mail delivered by carrier route to physical addresses. Only signatories of the Caller Box 702 may go to the Caller Box 702 window at the post office to claim the mail.

Each Post Office 701 preferably includes at least eight Caller Boxes 702 for the service. Processing is facilitated by having the mail already sorted into eight categories:

Black and white scanner, 6 month hardcopy archive, scan first class mail only (no "junk" mail)

Color scanner, 6 month hardcopy archive, scan first class mail only

Black and white scanner, 3 year hardcopy archive, scan first class mail only

Color scanner, 3 year hardcopy archive, scan first class mail only

Black and white scanner, 6 month hardcopy archive, scan all mail

Color scanner, 6 month hardcopy archive, scan all mail

Black and white scanner, 3 year hardcopy archive, scan all mail

Color scanner, 3 year hardcopy archive, scan all mail

Additional Caller Boxes 702 are established when the caller box subscriber capacity of 9,999 is reached or for large corporate subscribers who want a dedicated Caller Box 702 of their own. Alternatively, if a dedicated zip code is used post office boxes are grouped sequentially into the eight categories instead of using caller boxes.

Generally, all Satellite Mail Processing Facilities have at least two scanners 7022: one Black and White and one Color. Different Caller Boxes 702 separate the mail to be processed by the different scanners.

Subscribers 704 have at least two hardcopy archive duration periods 7023, such as 6 months and 3 years. To facilitate purging at the end of the hardcopy archive duration period, Original Mail Pieces 707 with different hardcopy archive duration periods are stored in different places. Different Caller Boxes 702 separate these categories.

Subscribers 704 have the choice of receiving first class postal mail only via email, or of receiving all mail via email 7024. Different Caller Boxes 702 separate these categories as well.

Each Caller Box 702 has a maximum number of Subscribers 704, such as up to 9,999. When users sign up for service, they must specify a User ID unique to the system 7042, a Password 7043, one or more Characteristics 705, and one or more Subscriber Preferences 706. The Subscriber 704 uses their User ID and Password to gain secure access to their database information. Each Subscriber 704 has a User ID 7042 and a Password 7043. Subscribers 702 may be grouped into an Account 703 (as with one company that has many employees) so that billing and administration may be consolidated. The Account 703 (group of Subscribers 704) has a Primary Subscriber 7031 who administers the account.

Based on the Subscriber Preferences for the City (Post Office), Scanner Type 7022 (e.g. black and white or color), Hardcopy Archive Duration 7023 (e.g. 6 months or 3 years), and First Class Mail Only 7024 (yes or no), the Subscriber 704 is assigned the Post Office Address 3011 and Caller Box Number 7021. For that Caller Box 702, the Subscriber 704 is assigned the next available Subscriber Box Number 7041. These components make up the Mailing Address the Subscriber 702 will use to receive mail (see FIG. 8). These Subscriber Preferences (7011, 7021, 7022, 7023, 7024) are not changed without changing the Mailing Address.

Each Subscriber 101 has one or more Characteristics 705 stored in the Database 608, which are specified during the Subscriber Sign Up 604 process and may be modified by Logging In 606. Subscribers 101 enter their primary Address 7051, but may also enter additional addresses including a billing address, shipping address, and address book addresses. Subscribers 101 may enter names and addresses of recipients they plan to send letters to using the service. With the names and addresses stored, it is not necessary to retype them each time a letter is sent to them. The Subscriber 101 may enter their phone and fax numbers 7052. Primary and secondary email addresses 7053 may also be entered. Image files of postal service mail are forwarded to the primary email address; if they are returned, the files are forwarded to the secondary email address. For security purposes, all credit card billing information is stored by the credit card processing company. Only a pointer 7054 to this data is stored in the Database 608. Additional names and company names 7055 that mail could be addressed to are also entered into the Database 608. The Alternate Addressees are used along with the Subscriber Box Number to associate incoming mail to the Subscriber 101. Demographic data 7056, such as how the Subscriber 101 heard about the service, their primary language, occupation, industry, gender and other information is stored to be used for marketing purposes. A Service Start Date 7057 and Service Stop Date 7058 are recorded in the Database 608. All active Subscribers 101 have a blank Service Stop Date 7058. Pricing terms 7059 agreed to by the Subscriber 304 are detailed in the Database 608. Special promotional rates are also recorded. This information is used to bill the Subscriber 101 periodically. If a Subscriber wants to stop email delivery of postal service mail for a specified period of time (such as when on vacation) a Vacation Hold Start Date 7060 and Vacation Hold Stop Date 7061. All mail received during the period is emailed the day following the Vacation Hold Stop Date 7062.

Each Subscriber 101 has one or more Subscriber Preferences 706 stored in the Database 608, which are also specified during the Subscriber Sign Up 604 process and may be modified by Logging In 606. Subscribers 101 may select from several different Image Types 7061 including TIF, Image-Only PDF, and text-searchable Text-And-Image PDF. Mail will be scanned into image files and converted into the preferred Image Type 7061 before being forwarded to the Subscriber email address 7053. The Subscriber 101 may specify how long their image files are to remain in the online repository before being purged 7062. Image files may be archived to CD-ROM and mailed to the Subscriber 304 before purging. The Subscriber 704 specifies forwarding procedures 7063 for mail that is not scannable (e.g. parcels). Non-scannable mail may be returned to sender or forwarded to an address specified by the Subscriber 704. Subscribers 704 may opt to have advertising 7064 inserted into their emails to reduce their subscription costs. Subscribers 704 choose a number between 1 and 10 to specify an Image Quality preference 7065, where 1 equals low quality and small file size and 10 equals high quality and large file size. Subscribers 704 also have the opportunity to have the image resized 7066, such as reducing the size of the image to a computer screen to further reduce the size of the file. Subscribers 704 may choose to have the image file sent to them as an attachment 7067 or have a link to the file in the repository. The link may be preferred to the attachment since it does not require the email software storage space for the attachment. Subscribers may opt for added security by having an encryption process 7068 applied to the attachment. Subscribers may also request that only first class mail be processed and that all other mail be destroyed 7069. This feature is used to reduce "junk mail."

Each Subscriber 704 has one or more Mail Pieces 707 stored in the Database 608. After automated extraction equipment removes the mail contents from every envelope, Mail Separation Sheets with unique bar code numbers (Mail Piece Numbers 7071) are placed between the extracted contents of every scannable mail piece. The unique bar code numbers are written to the Database 709 for every Mail Piece 707 that is emailed to the Subscriber 704. The number of pages 7072 in the Mail Piece 707 is also written to the Database 709 for billing purposes. The Mail Piece Number 3071 is stored in the Database 608 and is a pointer to the much larger corresponding Image Files that are stored in the Repository during processing (see FIG. 1). Subscribers 101 may use Log In 606 to request the original hard copy of mail pieces by specifying this unique Mail Piece Numbers 7071. This request and the date it is fulfilled are both noted in the Database 608.

Each Subscriber 101 has one or more Transactions 708 stored in the Database. Any interaction with the Subscriber 101, such as charges, payments, and customer service notes, are stored as a Description and Amount 7081 in Transactions 708.

Each Subscriber 101 may have one or more Send Letters 709 stored in the Database 608. Subscribers 101 may use the Subscriber Login 606 and generate letters via the Internet 306 that are to be printed and delivered via Postal Service Mail. The Subscriber 101 enters a pointer 7092 to the Return Address 7051, pointer 7093 to the Recipient Address in the Address Book 7051, and text of the message to be sent 7094. Software prints the letter at the Post Office closest to the Recipient, enters a charge into a table in the Transaction 708, and writes a date/time stamp 709 to a table in the Send Letter 709.

Subscribers may change Subscriber Preferences (such as image quality and size, image type, first class only, and archiving preferences—see FIG. 7B Database Detail 706. Preferences) at any time via password-protected web access to their account. They may also create letters while logged in to their account to be sent via postal service mail or request original mail pieces from the Mail Repository.

Mail Processing 1005 takes place at each Satellite Office 105. Early every morning mail is delivered, couriers pick up mail from the Caller Boxes 702 at the Post Office 107 and deliver it to the Satellite Mail Processing Facility (step 1101).

For security reasons, only couriers who are signatories of the Caller Boxes 702 are allowed access to them by the Post Office.

Several measures are taken to ensure the promptest mail delivery for subscribers 101. Caller Boxes 702 are used for the service because the Post Office usually delivers mail to them before they deliver it to the courier routes. Mail is picked up by courier as soon as it arrives at the post office to ensure the promptest delivery to the subscribers. Satellite Offices are located as close as possible to the Post Office to further ensure prompt delivery. Only main postal facilities (where mail first arrives for the city or region) are selected for Caller Boxes 702. Care is taken during the delivery to ensure that mail remains in the proper Caller Boxes 702 according to the assigned categories and does not get mixed up.

While most Subscriber mail is delivered to the Post Office, some mail may be delivered directly to the Satellite Office. For example, Federal Express will not deliver to a post office box. In this case Subscribers 704 use the address of the Satellite Office, but also include their Caller Box number to simplify the sorting process. Mail delivered directly to the Satellite Office is combined by category with the mail from the Post Office (step 1102).

Unscannable mail such as parcels are separated from the mail (step 1103). The operator uses the proprietary Process Unscannable Mail software to enter the Caller Box 704 and Subscriber Box Number. Software queries the Subscriber's information in the Database 608 (step 1104). Based on a Subscriber's Forward Preference 7063, the software will either print a label with "Return to Sender" or with the address to forward the package (steps 1105-1107). Postage is be printed on the label, if required. (step 1106). The postage may be obtained through an interface to an Online Postage service (popular services include estamp.com and stamps.com). The software enters a Transaction 708 in the Database 608 with processing charges (if applicable) for that Subscriber 101 in the Database 608. After all the Unscannable Mail is labeled it is mailed. Finally, all non-first class mail is removed from the "scan first class mail only" categories of mail.

Create Separator Pages software is used to print Separator and End of Batch pages (step 1108). A supply of these printed forms is printed in advance and kept on hand. The bar code number on the Mail Separator Sheet (see FIG. 12) uniquely identifies mail pieces. The End of Batch Sheet (see FIG. 13) must be placed at the end of each batch of documents that is fed to the scanner.

The remaining mail is now ready to be processed into batches of documents to be scanned. Automated mail extraction equipment is used to open the mail and extract the contents (step 1109). The operator ensures that several procedures are accurately followed to ensure proper processing of the mail. First, all envelope contents are prepared to run smoothly through the scanner. For example: folded papers are flattened, and staples and clips are removed. Second, Mail Separator Sheets are sequentially inserted in between every mail piece. Third, the envelope or page (when a window envelope is used) with the Subscriber Address are placed immediately after the Mail Separator Sheet. Fourth, the Caller Box on the Mail Separator Sheet are arranged to correspond to the Caller Box 702 of the mail. Fifth, a batch, which is a set of documents to be run through the scanner all at once, are arranged to contain mail from only one Caller Box 702. The Mail Separator sheet is inserted right side up. To speed processing, however, it is not required that other pages be inserted right side up. These pages are auto rotated systematically.

Once a batch is prepared, it is immediately passed on to be scanned into computer image files (step 1110). Operators employ capture software and high speed color and black and white duplex scanners to convert batches of original mail pieces into computer image files. Each page in the batch is converted into two separate image files (one for the front, one for the back) and numbered sequentially. Images files for each batch are created in separate directories to avoid duplicate file names. Directories of image files are transferred, such as via a secure connection, to servers at the Central Office 103 (step 1111).

After scanning, batches of original mail pieces are boxed and labeled with the range of sequential numbers from the Mail Separator Sheets. The boxes are also labeled with the Hardcopy Archive Duration (e.g. 90 days or 3 years). Boxes are delivered to a secure Hardcopy Storage 1007 and ordered sequentially for easy retrieval (step 1112). Original mail pieces are available to Subscribers 101 upon request. Boxes with different Hardcopy Archive Durations are stored in different locations to facilitate uniform purging.

FIG. 12 shows a Sample Mail Separator Sheet. This sheet contains a unique number for the mail piece 1201 and an equivalent bar code 1202 for accurate reading by the computer. The first two digits 1203 of the unique number 1201 are preferably the same (e.g. "57") to help differentiate the Mail Separator Sheet bar code from other bar codes that may appear in the mail. The next four digits are a system assigned Caller Box number 1204. This number is unique throughout the system (not just the Post Office) and corresponds to the Caller Box 702 assigned by the Post Office 107. The last 10 digits are a system assigned Mail Piece Number that is unique to the Caller Box 1206. The combination of the Caller Box Number and the Mail Piece Number (1204 and 1206) uniquely identifies the mail piece throughout the system.

FIG. 13 shows a Mail Piece End of Batch Sheet. Like the Mail Separator Sheet shown in FIG. 12, this sheet contains a unique number for the mail piece 1302 and the equivalent bar code 1301 for accurate reading by the computer. The first two digits 1303 of the number are preferably the same (e.g. "57"), as with the Mail Separator Sheet, to help differentiate the Mail Separator and End of Batch bar codes from other bar codes that may appear in the mail. Unlike the Mail Separator Sheet shown in FIG. 12, the last 14 digits of the Mail Piece End of Batch Sheet shown in FIG. 13 number are all zeros 1304. In the middle of a batch, the Mail Separator Sheets of FIG. 12 indicate when the pages from one mail piece have stopped and the next mail piece starts. However, the Mail Piece End of Batch sheet of FIG. 13 is needed to indicate when the pages from the final mail piece in the batch have stopped.

FIG. 14 diagrams a sample batch ready to be scanned. A first page 1401 is the Mail Piece Separator Sheet. All Separator Sheets and End of Batch Sheets are inserted right side up (the arrow pointing upward). Immediately following the Mail Piece separator sheet is a document with the Subscriber Mailing Address, which in this case is an envelope 1402. Next is the contents of the envelope 1403. After the contents is another Mail Piece Separator Sheet 1404. Separator sheets are in sequential order to facilitate mail piece retrieval from storage. Again, the document with the Subscriber Mailing Address 1405 immediately follows the Mail Piece Separator Sheet. In this case it is a letter with the Subscriber Mailing Address—probably a window envelope was used for this mail piece. This pattern repeats itself 1406 until finally a Mail Piece End of Batch Sheet is placed at the end of the batch 1407.

FIG. 15 details the steps for scanning the batch. The batch FIG. 14 is placed into an Autofeed Duplex (double-sided)

Scanner (step 1501). Care is taken to run the batches through the corresponding Scanner Type. For example, batches from Caller Boxes 702 designated for color scanners are run through a color scanner while batches from the Caller Boxes 702 designated for black and white scanners are run through a black and white scanner. Popular brands of high volume duplex scanners include, for example, Fujitsu, Kodak, and Canon. Capture software 1502 is used to interface the computer with the scanner to produce image files. Image files may be created in .tif (tagged image file) format for compatibility reasons. The file names are sequential numbers followed by the .tif extention. Each batch is written to a separate and unique folder (1801-1809) at the Central Office to eliminate overwriting duplicate file names. A "b" appears after the number if the image file is black and white; otherwise the image file is color. Color scanners and their capture software are configured to create both color and black and white images of every side of every page. Black and white scanners and their capture software are configured to create only black and white images of every side of every page. Black and white images are used for subsequent OCR processing. Computers at the Satellite Office are connected to only one scanner to ensure top performance. Image files are stored locally on the computer. Satellite Office computers are networked to the Central Office to facilitate centralized administration and file transfer to the Central Office.

Central Office Processing 502 accepts files from the Satellite Offices then prepares and emails them to the Subscribers. Image files from Satellite Mail Processing Facilities are transferred from the local computers via secure connections to corresponding folders on a Central Office Collection File Server 1601. The Collection File Server 1601 contains a folder 1801-1809 for every Satellite Office computer/scanner. Each of those folders 1801-1809 contains a folder for each batch processed by the Scanner (step 1501). A proprietary Barcode Rename software routine 1701 runs continuously in the background on a dedicated server and repeatedly queries folders (batches) on the Collection File Server 1601. For every batch, the software sorts the "b" files (black and white) by filename then reads through the files sequentially. Bar codes from black and white files can be more accurately decoded. Furthermore, all batches have black and white image files but not all batches have color files (e.g. Caller Boxes 702 for Subscribers 704 who only want black and white image files).

When a Mail Code Separator Sheet is identified, the barcode is decoded using barcode recognition software 1901 (step 2001) into the Mail Separator Sheet Number (e.g. 1203). All subsequent files until the next Mail Piece Separator Sheet or End of Batch Sheet are renamed with the Mail Separator Sheet Number without the constant 1204 ("57") and an underscore followed by the page number. A "b" is inserted before the underscore for all black and white files. All blank pages are removed at this time. All image files have unique names and are placed in one directory for subsequent processing. Image files from the Collection File Server 1601 are archived as they are processed to make room for more files from the Satellite Mail Processing Facilities. The image files with the Mail Piece Separator Sheets are not written to a consolidated Image Files Server 1603 since that information is now a part of the filename. Mail Piece End of Batch Sheets are not written to the Image Files folder 1603 either since mail pieces are now grouped by filename. If the Barcode Rename Software 1901 encounters errors (step 2003), the processed is done manually (step 2004). Files are then renamed to the Image File Server 1603 based on the bar code (step 2005). All events are logged to a Barcode Rename Log File 2006.

A Proprietary Tag With Preference software routine creates a corresponding text file for every mail piece with the information needed to process and email. FIG. 22 describes the contents of the Preference File. The first line 2201 is an OCR Return Code and Description. This code indicates the confidence level that the Subscriber Address on the first page of the mail batch matches the Subscriber 101 referred to in the file. The higher the number, the higher the confidence level. If the code equals zero, no match was found and there are no other lines in the file. The second line is a Subscriber Number that uniquely identifies the matched Subscriber in the Database 2202. This Subscriber Number may be a Mail Code Number, Insurance Policy Number, Case Number, or any other number that uniquely identifies the Subscriber and Subscriber Preferences. The third line 2203 is a header with corresponding values in the fourth line 2204. These lines list the Subscriber Preferences such as scanner type, image type, archive preference, ad preference, quality preference, resize preference, attachment preference, encryption preference, and first class mail only preference. The fifth line 2205 is an email address to send the mail piece to as specified in the Subscriber Preferences. Subsequent lines list additional email addresses to which to send the mail piece.

FIG. 23 describes the Subscriber Match Confidence Level. The first page of each mail piece is analyzed using Optical Character Recognition technology to convert the image into text. The text is then searched for a Subscriber Address which is used to link the mail piece with a Subscriber in the database. The confidence level of this process is defined by the OCR Return Code. 0 indicates that there is no match, such as because the OCR process was disabled due to a parameter setting, the OCR process encountered a recognition error and aborted, or the OCR process returned an empty string probably indicating a page with no text. A number greater than zero indicates that a Valid Subscriber Number was found in the text. The confidence level increases based on other criteria that is found. The points associated with each criteria are listed in FIG. 12. For example, if a Valid Subscriber Number is found preceded by the Subscriber Number prefix which is preceded by the word "Paperless" which is preceded by a word from either the Subscriber Name, Company Name, or Alternate Addressees which is all followed by the Caller Box, a return code of 70 is calculated: 20+15+5+15+15. The pseudo code for calculating the Confidence number is detailed in FIG. 26.

After the image files containing the mail pieces are given unique filenames, the Tag With Preference process associates the Subscriber and their preferences to each image file. The Tag With Preference process 2102 runs continuously as a background process on a dedicated server. The Database 608 is queried periodically (e.g. every three hours) to refresh a Two Dimensional Preference Array 2101. The in-memory array is used to expedite processing; a lookup in an in-memory array is much faster than a query to a database. The array is indexed by the Caller Box 702 on one dimension and on the Subscriber Box Number on the other. The index is used to expedite processing: an indexed lookup is much faster than a find sequentially searching through the array. There is one record in the array for every Subscriber 101. Each record contains the Subscriber Number and all Subscriber Preferences. It also contains an array containing the Subscriber Name and all Alternate Addressees and another array containing email addresses where mail pieces are to be sent with their corresponding email types (e.g. primary and secondary).

Image files created by the Barcode Rename software routine reside in a folder 1603. The OCR process is run four times on every black and white first page of every mail piece that does not already have a corresponding Preference File: once at 0 degrees, once at 90 degrees, once at 180 degrees and once at 270 degrees (step 2401). The four OCR versions are performed to compensate for the page being upside-down or sideways. If the word "Paperless" is found, that version of a OCR Text Result is passed on to the Write Preference File process and no other versions are performed. If "Paperless" is not found, the version of the OCR Text Result with the highest confidence level (returned by the OCR process, not the same as FIG. 23) is passed on to a Match Subscriber to Mail Piece process (step 2402).

The Match Subscriber to Mail Piece process (step 2402) uses the methodology outlined in the pseudo code in FIG. 26 to write the .pref or .verify to the Image Files Server 1603 with the files created by the Barcode Rename process. This process runs continuously in background on a dedicated server. A Verify Threshold routine for the OCR Return Code is set as a configuration parameter for the program. If the OCR Return Code is equal or below the Verify Threshold (indicating a low confidence level) (step 2405), the Output File is suffixed with ".verify" and a compressed version of each page of the image file (.jpg format) is written to an Image Files folder (step 2406). If the OCR Return code is above the Verify Threshold (indicating a higher confidence level) (step 2403) the Output file is suffixed with ".pref" (step 2404). If the Verify Threshold is set to 0, only mail pieces with no match at all will be verified. If the Verify Threshold is set to 10 all mail pieces will be verified (given a ".verify" suffix). .verify files will be verified by an operator before being processed by the Process By Preference FIG. 28 software. All events are written to a Tag With Preference Log File 2103.

In addition to associating a mailpiece to its subscriber, the Match Subscriber to Mailpiece process may be expanded to further characterize the mail piece by using Descriptor(s). Two related tables can be added to the Database, a Descriptor table and a Keyword table. Each Subscriber may have one or more Descriptors; for each record in the Descriptor table, one or more records may exist in the Keyword table. After executing the process described above to associate the recipient to the mail piece, the Match Subscriber to Mailpiece process would scan the OCR output of the entire mail piece for records in the Keyword table. The Keyword table may contain boolean logic. The Descriptor(s) associated with the Keyword(s) found would be appended as an additional line to the .perf or .verify file. Even if multiple Keywords for the same Descriptor are found, that Descriptor would only be listed once. For example, a Subscriber might want to identify financial statements. A Descriptor record containing "Financial Statement" would be entered in the Descriptor table. Keywords that are uniquely found on financial statements would be entered in the Keyword table: "Monthly Statement AND Merrill Lynch", "Bank of America AND Standard Checking Statement." If either of these keywords were found in the OCR of the document, the "Financial Statement" descriptor would be appended as the last line of the .perf or .verify file. This information may be used to further route the mail piece once it is received by the recipient into a records management system, workflow process, or folder in a repository. Alternatively, the Match Subscriber to Mailpiece process may create a separate file in XML format to indicate the Descriptors instead of adding them as the last line to the .verify or .perf file.

This process may be used to filter out unwanted mail such as presorted standard clas mail a.k.a. "junk mail." Mail pieces that include terms required by the United States Postal Service to identify non-first class mail such as "presorted standard" or "prsrt std" in the proximity of the postmark would be discarded and never forwarded to the Subscriber if the Subscriber prefers to receive only First Class Mail.

The mail piece may be further characterized by having the Match Subscriber process parse out the Return Address. The OCR result of the entire document can be searched for Address Components (city, state, zip) that are proximate to the Mailing Address. The found Return Address can be appended as an additional line in the .verify or .perf file or included in a separate file in XML format.

A Verify Preference software component is invoked for every .verify file. The Database 608 is queried periodically (e.g. every three hours) to refresh a Caller Box 2105 and Two Dimensional Preference Arrays 2101. The in-memory arrays are used to expedite processing; a lookup in an in-memory array is much faster than a query to a database. The Preference Array 2101 is indexed by the Caller Box on one dimension and on the Subscriber Box Number on the other. The index is used to expedite processing; an indexed lookup is much faster than a find sequentially searching through the array. There is one record in the array for every Subscriber 101. Each record contains the Subscriber Number and all Subscriber Preferences. It also contains an array containing the Subscriber Name and all Alternate Addressees and another array containing email addresses where mail pieces are to be sent with their corresponding types (e.g. primary and secondary).

A proprietary Verify Software routine 2104 runs on a Web Server (popular brands include iPlanet, Apache, or Microsoft Internet Information Server). The Verify Software routine 2104 queries the Image Files Server 1603 for all image files related to ".verify" files. Compressed .jpg image (or images) for the mail piece associated with the .verify file are displayed for the operator on a Browser (step 2501). While viewing the Subscriber Address on the image file, the operator queries the Preference Array by Caller Box Number, Subscriber Number, Subscriber Name and Alternate Addresses to find a match. If a match is found (step 2502), the .verify file is replaced with a .pref file (see FIG. 22 for Preference File Description) and the .jpg file is deleted (step 2503). If a match is not found (step 2504), the .verify file is renamed with the ".verify2" extention for verification by a Level 2 (more experienced) operator (step 2505). If the Level 2 operator is unable to find a match (step 2508), the .verify2 file and all related image files for the mail piece are moved to a Dead Letter folder (step 2509). Files from the Dead Letter folder are periodically archived to tape or CD to ensure adequate disk space. Log text is written to the Verify Software Log File 2108 every time a mail piece is processed by the Verify Software.

FIG. 27 details the user interface (screen display) of the Verify Preference software consistent with the present invention. All components of the system are designed into a screen 2701 to facilitate rapid processing of images that need to be verified. The screen 2701 is divided into three windows: 1) Viewer 2702, 2) Selections 2705, and 3) Results 2716. When the screen 2701 is brought up, the system queries the Image Files Server 1603 for a file with a .verify extention. The extention is renamed .verifyx to stop other users from picking the same file for verification and allow multiuser processing. The first window is a Viewer 2702, which brings up all pages of the mail piece starting with the first page. The user may scroll up and down or left and right. This image should contain a Subscriber Address 2703. A compressed .jpg version of the image is used to speed image display. Standard viewer controls including Next Page, Previous Page, Beginning of Pages, End of Pages, Rotate, Hand Tool, Zoom In and Zoom Out are located at the bottom 2704 of the screen 2701.

The object of the software is to allow the user to match the Subscriber Address in the Viewer 2702 with the correct Subscriber 101 in the Database 608. Once the user has positioned the document in the viewer 2702 to prominently display the Subscriber Address 2703, a Selections Window 2705 is used to specify selection criteria to populate a list of possible Subscribers 2717 from the Database 608 in a Results Window 2716. If the user feels that the match chosen by the system (shown by default) is correct, they may press a Match Button 2723 to rename the .verify file to .pref and go to the next .verify file.

The user has three categories of possible Selections to specify: 1) Caller Box, 2) Subscriber Number, and 3) Subscriber Name and Alternate Addressees. Each category corresponds to a button at the top of the Selections Window 2705. When the button is pressed, it highlights and the criteria in a Selections Sub-Window 2710 for that category appears. For each category, the user is allowed to Search All 2711—which will clear out any other selections in the sub-window. The user may also opt to select one or more specific items from a multi-select list box 2712. When specifying Number or Name, the Caller Box specification is taken into account for the list. When specifying Number, the Name criteria is not taken into account for the list. When specifying Name, the Number criteria is not taken into account for the list. The user may also opt to enter a search 2713 of one or more words or numbers or a boolean string and must then specify how to use the search 2713: Starts, Exact, All, Any, or Boolean 2714 (only one selection may be chosen). Starts will return all matches that start with the entry; All requires that every character or word entered must be in the match; Any searches for any of the characters or words to be in the match; and Boolean allows the user to specify a Boolean phrase such as "(jon or john) and doe." If multiple selections are made, the tool uses the OR operand (not the AND operand). A Caller Box 2706 defaults to the Caller Box from the first four digits of the file name. If there is a Subscriber 304 match in the .verify file, the Number and Name default to that Subscriber 304. If there is no match, Number and Name default to Search All. Once the Criteria is selected, the user may push a Query button 2709 to list results 2715 for that sub-window below. The user may scroll the list of results 2715 up or down.

Once the user has entered criteria in the Selections Window 2705, a Query Selection 2722 button is pressed to create a list of possible Subscriber choices 2717 in the Results Window 2716. Once the Query Selections 2722 button is pressed, it renames to Query Within Results and the user may modify criteria in the Selections Window 2705 to query from within the results in the Results Window 2716. If the user presses the Clear All button 2721, the Query Within Results 2722 button renames back to Query Selections and the specifications in the Selections Window 2705 return to the default.

A Subscriber Name, Alternate Addressess, and Subscriber Address 2703 are listed for each Subscriber 101 in the Results Window 2717. This format is used so that it most closely matches the format of the Subscriber Address 2703 to facilitate matching. The user may scroll the Results 2716 up or down. If the user finds the match, a Select button 2718 immediately to the left of the correct Subscriber 101 is pressed. Then the .verify file is renamed .pref and the necessary data is written to the .pref file FIG. 22. The software then refreshes the screen to show the next mail piece to be verified. Any .verifyx files that are more than one day old are renamed to .verify to address the situation where a user might shut down the browser before completing the process.

If the user is unable to find a match, they press a No Match button 2719 and the file extention is renamed to .verify2 to queue the file to be verified by a Level 2 user.

Information about the last mail piece processed is stored in memory. If a user realizes they might have made a mistake they can press an Undo Last button 2720. The current mail piece is restored to .verify and changes made to the previous mail piece are undone and the image and matched Subscriber information are brought up on the screen.

The software is preferably browser-based and accessible over the Internet to allow users to work from almost any location. To access the system, the user opens a browser and types in the URL configured in the Web Server. The user is then prompted for a user ID and password for security purposes. User IDs and passwords are administered by the Web Server administrator. There are two categories of users: Level 1 and Level 2. Level 1 users are able to match about 80 percent of the mail pieces in question to Subscribers 101. Level 2 users review the remaining mail pieces a second time.

The system works slightly differently depending on whether a Level 1 or Level 2 user has logged in. For Level 1 users, the Caller Box 2706 defaults to the Caller Box from the first four digits of the file name and the user is not allowed to change it. The Caller Box button 2706 may be pressed to view the Selection information in subwindow 2710, however the selection information may not be changed. Level 2 users are allowed to change to a different Caller Box. The Caller Box should rarely be incorrect—this will occur only if mail from one Caller Box was mixed with another before scanning. For Level 1 users, the tool queries the Image Files folder for .verify files (step 1504). For Level 2 users, .verify2 files are queried. When a Level 1 user is unable to make a match they press the No Match button 2719 and the file extention is renamed to verify2. When a Level 2 users has logged in, the No Match button 2719 is titled Dead Letter. If a Level 2 user is unable to make a match, they press the Dead Letter button and all files associated with the mail piece are moved to a Dead Letter folder (step 2509).

Once a Subscriber 101 is associated with a mail piece, a Process By Preference component consistent with the present invention enhances the image, processes it based on Subscriber Preferences, then emails it to the Subscriber 101. Software for running the Process By Preference runs in the background on a server and repeatedly queries the Image Files Server 1603 for all files for a mail piece associated to a .pref file. Each image file is enhanced (step 2901). The enhancements include processes such as deskew, despeckel, trim and remove border. The OCR process is run four times on each black and white page to Auto-Rotate the image (step 2902). The OCR process is run once at 0 degrees, once at 90 degrees, once at 180 degrees and once at 270 degrees. The four OCR versions are performed because the page may be upside-down or sideways. The version of the OCR result with the highest confidence level is used to rotate both the black and white and corresponding color images. If requested by the Subscriber 101 (as indicated in the .perf file) the image is Resized (step 2903). The resizing may, for example, reduce the image to fit the size of the computer screen and decrease the size of the file. If the Subscriber 101 requested the Ad Supported service (as indicated in the .perf file), a Banner Advertisement is inserted in the image file (step 2904). The processed images are then saved to a file based on Subscriber Preferences such as PDF Image Only (step 2905), TIF (step 2906), or PDF Image and Text (step 2907). All pages are combined into one file. The quality vs. file size parameter as specified by the Subscriber 101 (as indicated in the .perf file) is taken into account during the save.

Image type Subscriber Preferences such as .tif or .pdf image-only that do not require an additional processing component are written to the Subscriber's folder on a Repository File Server (step 2909). If the Subscriber 101 wants the image as an attachment 7067 to the email (instead of only an HTML link to the Repository) the file is also written to an Image Files To Email Folder (step 2908). The .pref file is moved to the Image Files To Email Folder (step 2908) regardless of the Subscriber's attachment preference. The "b" is removed from the image filename—either black and white, color, or grayscale files are saved, depending on the preference of the Subscriber 101. Records are written to the Process By Preference Log File 2804 for every file saved (step 2910). Image files are written to the Image Files To Email folder to limit reading from the Repository when files are attached to improve user performance when using the Repository. Furthermore, this temporary version of the file is needed to avoid the situation where the Subscriber 101 might move the image file to a subfolder before the email is sent, causing a file not found error when an Email Image 3002 (see FIG. 18) process is running.

If the Subscriber 101 requested an image type such as a PDF Image and Text that requires an additional processing component, both color and black and white .tif files (each with all pages combined into one file) are written to the folder corresponding to the processing component (step 2907), such as a PDF Image and Text folder 2802. A separate process (that preferably runs continuously in the background) queries the PDF Image and Text folder for files and creates the text portion from the black and white file using an OCR process. Then the text is saved with the image in PDF image and text format (step 2907) and written to the Subscriber's folder on the Repository File Server (step 2909). If the Subscriber 101 wants the image as an attachment 7067 to the email (instead of only an HTML link to the Repository) the file is also written to the Image Files to Email Folder (step 2908). The .pref file is moved to an Image Files To Email Folder 1606 regardless of the Subscriber's attachment preference. Records are written to the Process by Preference Log File for every file saved (step 2910). Other processes for image types that require an additional processing component operate in a similar manner.

After the image file is processed according to Subscriber Preferences, the Email Image component is invoked. Email Image software 3002 preferably runs continuously in the background on a server querying an Image Files To Email folder 3001. For each image file, the Email Image software 3002 prepares an email addressed to the address(es) specified in the .perf file, inserts the Subscriber Number from the .perf file in the subject of the message and inserts advertising banner(s) in the body of the message if the Subscriber 101 has indicated a preference for the ad supported service (also as indicated in the .perf file). A highly compressed image of the first page of the mail piece is imbedded in the text of the email. This image allows the recipient to get at a glance, in most cases, a general idea of whom sent the mail piece. Descriptors and/or the Return Address can also be included in the text or subject of the email message to be used to systematically route the mail into folders on the email client or records management system, or into a particular workflow process. Based on the Subscriber attachment preference 3067, either the image file is attached to the email (an image file exists in the Image Files To Email folder 3001) or a link to the file located on the Repository is inserted in the message (no image file exists in the Image Files To Email folder 3001). The message is then emailed via the Internet 306 (step 3003). This process is designed to be multi-threaded to ensure the highest processing volume. A record is written to the Email Image Log File 3004 for every event. A nightly process (step 3005) reads Email Image Log File 3004 records for emailed images and writes corresponding records to the Mail Piece table 707 in the Database 608 for billing and hardcopy retrieval purposes.

Over the Internet 306, each email is routed to its corresponding Email Server 3006. If the email address is valid, an Email Server 3006 routes the email to the corresponding Subscriber 101 (step 3008) who receives the email using Email Client software 3007. If the email address is invalid, the Email Server 3006 rejects the email and it is routed to a Handle Returns software program 3009 via the Internet 306.

The Handle Returns software 3009 preferably runs continuously in the background on a dedicated server receiving returned emails. When it receives a rejected email, it waits 24 hours and re-sends it to the same address. This process is repeated until the email is returned an additional number of times, such as twice. After the email is returned a certain number of times, such as four, the software parses the Subscriber Number from the subject of the email message and queries the Database 608 for an alternate email address for the Subscriber and forwards the email to this address. If returned, it again repeats the same process of waiting 24 hours and sending it again, up to a set number of times, such as three. After a settable number of attempts over the course of a settable number of days, the system stops trying. Notes of this activity are entered in the Recipient's Transaction data in the Database 608 and written to the Handle Returns Log File 3011.

Files are available for users to view and download over the internet using the Repository component consistent with the present invention. After the Process By Preference software (see FIG. 28) writes image files to the folder named after the Subscriber Number on the Repository File Server 3103, Subscribers 101 may view these images by logging in 211 to their password-protected account using a browser (popular brands include Microsoft Explorer or Netscape Navigator) connected to the Internet 306. For security reasons, a Firewall 601 (popular brands include Cisco's PIX, Checkpoint, and Watchguard) permits access from the Internet 306 only to specified ports on a Repository Web Server 3101. The Repository Web Server 3101 facilitates thousands of simultaneous users. Depending on the number of users, multiple Web Servers may be deployed. Redundant Web Servers also increase reliability by providing backup should a server go down. The Repository Software 3102 allows the Subscriber 101 to administer or control their repository. This control includes access to their assigned folder, the ability to create, delete, and rename folders within their assigned folder, the ability to organize images within those folders, the ability to download images, and other features such as full-text searching and keyword searching. A Repository Software program 3102 accesses the Database 608 via the Application Server 607 as needed to query data such as login userid, login passwords, and preferences. Based on Subscriber Preferences stored in the Database 608, image files are archived to CD-ROM 3104 or other storage.

Subscribers 101 may create letters via the Internet 306 to be printed and mailed via conventional mail by logging in 606 to their password-protected account using a broswer (popular brands include Microsoft Explorer or Netscape Navigator) connected to the Internet 306. For security reasons, a Firewall 204 (popular brands include Cisco's PIX, Checkpoint, and Watchguard) permits access from the Internet 202 only to specified ports on the Web Server 205. The Web Server 602 facilitates thousands of simultaneous users. Depending on the number of users, multiple Web Servers may be deployed. Redundant Web Servers also increase reliability by providing backup should a server go down. The Subscriber Login 606 software authenticates the user and gives them access to their account. The subscriber 101 enters three components of the letter via a form that is preferably web-based 3201. First, a return address from the Address table 7051 of the Database 608 is selected and entered into the Send Letter table 7092. Second a recipient address is selected from the Address table 7051 and entered into the Send Letter table 7093. Third, the text of the message 7094 is entered. One record for every letter is entered into the Send Letter table 709 of the Database 608.

A proprietary Send Letter software program 3202 preferably runs continuously in the background on a dedicated server. Whenever a new record (Date Sent 7091 equal to null) is entered into the Send Letter table 7093 of the Database 608, the Send Letter 3202 software combines the three components into a letter 3204 and prints it out at the facility closest to the Recipient Address. On-Line postage 3203 from a provider, such as stamps.com or estamp.com, is applied to the letter. These letters are mailed at the Post Office 3205. The Send Letter software 3202 marks the Send Letter record with a Date Sent timestamp 7091 and applies charges to the Transaction table 708 in the Database 608.

Billing software 3301, which queries the Database 608 via the Application Server 607, is run a settable number of time a day by an operator, but preferably at least once. Each time the system is run, it bills Subscribers with a Service Start Date 7057, which is the day of the month equal to the current day of the month. Days since the last day the process was run are also billed to take into account Service Start Dates 7057 equal to non-working days or during previous months longer than the current. Each Subscriber is billed monthly, roughly on the day of their Service Start Date 7057. In other words, Subscribers who started their service on the $5^{th}$ day of the month are billed roughly on the $5^{th}$ of each month.

Based on Pricing Terms 7059 (which usually specify a fixed monthly charge plus a cost per thousand images scanned) and the summed number of scanned pages in the Mail Piece table 7071 for the billing period, a Total Charge is calculated and entered in the Transaction table 708. If Credit Card Data 7054 exists for the Subscriber, a corresponding charge is processed through the Remote Credit Card Processing provider 605 and an entry for the payment is entered in the Transaction table 708. If no Credit Card Data 7054 exists for the Subscriber, the Billing software 3301 uses the Send Letter software to invoice Subscribers. The Billing software 3301 enters records into the Send Letter table 709 in the Database 608 for the system Subscriber (no charges to be generated). All charges and payments for all Subscribers grouped into one account are correspondingly grouped and applied to the Primary Subscriber 7031 (see FIG. 3B).

The operator of the Billing software manually enters Invoice payments 3302 into the system. Corresponding records for the payments are entered into the Transaction table 708. All Transactions for the day 708 are grouped and entered into an Accounting System 3303.

In the method and system consistent with the present invention, postal service mail is delivered via electronic mail. The mail is preferably delivered as attachments to or inserted within e-mail messages, such as with object files. The object file may be any of a variety of types of graphical image files, as selected by the subscriber.

Subscribers can receive postal service mail and email at the same time, using the same email account. When combined with unified messaging software, email, voicemail, faxes and postal service mail can all be made available in the user's email in-box. Subscribers receive postal service mail while travelling and avoid returning home to surprises found in mail accumulated while they were away. Instead of collecting mail and express mailing it to travelling employees, employees can get their mail same day at a lower cost.

Companies doing business in another country will have an enhanced presence there. The system can provide them with an address in that country to receive their mail more quickly and reliably than if the mail were delivered conventionally to their home address. As a result, customers can receive better service and overseas companies will make it easier to do business with them.

Customer relationship management software can also be enhanced. When a customer calls to reference a letter they sent, images of their correspondence will appear on the computer with their account information. Customer service representatives can address customer needs right away and not need to spend time looking for hardcopy letters in file cabinets.

Consistent with the present invention, correspondence can be integrated with sales force automation software. As a result, when salespeople call on a client, they have all the information and correspondence for that client in one place—and can access it anytime, anywhere, preferably over the Internet.

For law firms, all correspondence can be scanned into text searchable image files and stored by case ID on a dedicated password-protected repository. The subscriber administers secure access for firm members who can do keyword or full-text searches. Attorneys in private practice will be able to afford the same benefits.

Payment processes can be streamlined and help keep accounting records up to date. When invoices are received, image files of the invoices are sent both to accounting and to the designated manager for approval. Managers forward approval for payment to accounting via email. Invoices are processed more quickly and nothing is lost because everything is tracked on the computer.

Subscribers can also automate the process of updating their mailing lists. Change of address requests are systematically scanned in, converted to text, and merged into the mailing list database. Businesses can spend time growing their mailing list while the system will keep it up to date.

The costs for companies that currently open and scan mail can be significantly reduced. A more cost effective solution is available due to economies of scale achieved from combining many companies' work in one location specializing in mail extraction and document imaging processes. Companies can focus on their core business instead of mail extraction and scanning.

Recreational vehicle enthusiasts can stay in touch no matter where they travel. Americans living overseas will get their mail as fast as if they were still living in the United States. Subscribers can receive all their bills and statements via image files and organize them on the computer making piles of paper a thing of the past. Subscribers may process their mail more quickly by responding to postal service mail using the computer. Postal mail may be forwarded to one or more email addresses as quickly as forwarding a conventional email. Tools may be used to cut and paste images from postal mail into PowerPoint presentations, Microsoft word files, or other computerized documents.

Consistent with the present invention, subscribers can sign up for the service using a web interface by selecting Subscriber Preferences such as file format, length of time for original documents to be stored, image file size vs. image quality, email address(es) for mail forwarding, and names mail will be sent. Then, subscribers are assigned a Postal Service Caller Box based on their Subscriber Preferences and a Subscriber Box Number unique to that Caller Box. The Caller Box, Subscriber Box Number, City, State, and Zip code make up the Subscriber's Mailing Address. Subscribers give out their Mailing Address to everyone they want to use it (not, for example, to people who would be sending parcels). Subscriber mail arrives at the post office Caller Boxes and is delivered to a nearby Satellite Mail Processing Facility. There, automated extraction equipment is used to remove the contents from every envelope. Unscannable mail, such as parcels, are returned to sender or forwarded based on the Subscriber's Preference.

Mail Separation Sheets with unique bar code numbers are placed between the extracted contents of each scannable mail piece. The envelope or page with the subscriber's Mailing Address is placed immediately after the Mail Separation Sheet. The mail is scanned into image files that are electronically transferred to servers at the Central Office. Original mail pieces are housed at a secure Mail Repository storage facility and are referenced by the unique bar code number on the Mail Separator Sheet. Original mail pieces are available to Subscribers upon request.

At the Central Office, image files are grouped by mail piece using bar code recognition technology. OCR technology is used to extract the Mailing Address and associate the Subscriber and their Subscriber Preferences. Proprietary image processing software prepares the images according to Subscriber Preferences and emails them to the subscribers' email address(es). Images are stored in password-protected image repository servers for subscriber access via the internet. Subscribers may change many Subscriber Preferences at any time via password-protected web access to their account. They may also create letters while logged in to their account to be sent via postal service mail.

The foregoing description of a preferred embodiment of the invention has been presented for purposes of illustration and description. It is not intended to be exhaustive or to limit the invention to the precise form disclosed, and modifications and variations are possible in light in the above teachings or may be acquired from practice of the invention. The embodiment was chosen and described to explain the principles of the invention and as a practical application to enable one skilled in the art to utilize the invention in various embodiments and with various modifications suited to the particular use contemplated. It is intended that the scope of the invention be defined by the claims appended hereto and their equivalents.

What is claimed is:

1. A method for processing mail, comprising:
   receiving a mail item, wherein the mail item is a postal item having recipient information and one or more pages enclosed in the mail item;
   scanning the mail item including the recipient information and the enclosed one or more pages into an image file, the image file including image data of the recipient information and image data of the enclosed one or more pages;
   identifying a recipient from the recipient information in the image file,
   wherein identifying the recipient from the recipient information comprises:
      converting the image of the recipient information into text;
      matching the text of the converted image to profile information associated with a recipient, wherein the profile information associated with the recipient is stored in a database that comprises profile information for a plurality of recipients;
      calculating a confidence level of a match between the text of the converted image and the profile information associated with the recipient;
      comparing the calculated confidence level of the match to a threshold; and
   identifying a recipient for image file based on the outcome of the comparison of the calculated confidence level of the match to the threshold, and making the image file available to the identified recipient by at least one of transmitting an e-mail message, based on an e-mail address in the profile information, to the identified recipient, or storing the image file in a database accessible to the identified recipient, wherein the image file is not made available to the identified recipient if the image file does not comply with one or more recipient preferences.

2. A method according to claim 1, wherein the e-mail message includes a link to the image file.

3. A method according to claim 1, wherein identifying the recipient from the recipient information further comprises applying optical character recognition to the recipient information.

4. A method according to claim 1, further comprising:
   prompting an operator to check the image file if the calculated confidence level is below the threshold.

5. A method according to claim 1, further comprising:
   storing the one or more recipient preferences in a database; and
   determining how to process the image file based on the one or more recipient preferences of the identified recipient.

6. A method according to claim 5, wherein the one or more recipient preferences of the identified recipient include an image file format, a size of the image, an indication of whether to include the image file in the transmitted e-mail or to include a link to the image file stored in the database in the transmitted e-mail, an image quality; and the e-mail address.

7. A method according to claim 1, wherein the recipient information includes a caller box number and a recipient box number.

8. A method according to claim 7, wherein the caller box number is associated with a plurality of recipients and a particular post office location, and the recipient box number is unique to each recipient of the associated caller box number, such that each combination of caller box number and recipient box number is unique.

9. A method according to claim 1, wherein the mail item comprises an envelope.

10. A method according to claim 1, further comprising scanning the a return address on the mail item.

11. A method according to claim 10, wherein the e-mail message includes an image of the recipient and return address.

12. A method according to claim 1, further comprising:
    converting the entire image file into text;
    determining if the text includes one or more keywords; and
    identifying the mail item as a predetermined type of document based on the determination.

13. A method according to claim 12, further comprising routing the e-mail message in accordance with the identified type of document.

14. A method according to claim 1, wherein the recipient information includes at least a recipient name and a recipient address.

15. A method according to claim 1, further comprising inserting an advertisement into the e-mail message.

16. A system for processing mail, comprising:
  a scanner configured to scan a mail item including recipient information and one or more pages into an image file, the image file including image data of the recipient information and image data of the one or more pages, wherein the mail item is a postal item;
  a processor; and
  a memory, coupled to the processor, the memory comprising a plurality of instructions executed by the processor, the plurality of instructions configured to:
    receive the image file from the scanner;
    identify a recipient from the recipient address information in the image file, wherein the plurality of instructions for identifying the recipient comprise instructions to:
      convert the image of the recipient information into text;
      match the text of the converted image to profile information associated with a recipient, wherein the profile information associated with the recipient is stored in a database that comprises profile information for a plurality of recipients;
      compare the calculated confidence level of the match to a threshold; and
      calculate a confidence level of a match between the text of the converted image and the profile information associated with the recipient; and
    identify a recipient for the image file based on the outcome of the comparison of the calculated confidence level of the match to the threshold, and
    make the image file available to the identified recipient by at least one of transmitting an e-mail message, based on an e-mail address in the profile information, to the identified recipient, or storing the image file in a database accessible to the identified recipient, wherein the image file is not made available to the identified recipient if the image file does not comply with one or more recipient preferences.

17. A system according to claim 16, wherein the e-mail message includes a link to the image file stored in the database.

18. A system according to claim 16, the memory further comprising an instruction configured to apply optical character recognition to the recipient information.

19. A system according to claim 16, the memory further comprising instructions configured to:
  prompt an operator to check the image file if the calculated confidence level is below the threshold.

20. A system according to claim 16, the memory further comprising instructions configured to:
  store the one or more recipient preferences in a database; and
  determine how to process the image file based on the one or more recipient preferences of the identified recipient.

21. A system according to claim 20, wherein the one or more recipient preferences of the identified recipient include an image file format, a size of the image, an indication of whether to include the image file in the transmitted e-mail or to include a link to the image file stored in the database in the transmitted e-mail, an image quality, and the e-mail address.

22. A system according to claim 16, wherein the recipient information includes a caller box number and a recipient box number.

23. A system according to claim 22, wherein the caller box number is associated with a plurality of recipients and a particular post office location, and the recipient box number is unique to each recipient of the associated caller box number, such that each combination of caller box number and recipient box number is unique.

24. A system according to claim 16, wherein the mail item comprises an envelope.

25. A system according to claim 16, wherein the scanner is further configured to scan a return address on the mail item.

26. A system according to claim 25, wherein the e-mail message includes an image of the recipient and return address.

27. A system according to claim 16, the memory further comprising instructions configured to:
  convert the entire image file into text;
  determine if the text includes one or more keywords; and
  identify the mail item as a predetermined type of document based on the determination.

28. A system according to claim 27, the memory further comprising an instruction configured to route the e-mail message in accordance with the identified type of document.

29. A system according to claim 16, wherein the recipient information includes at least a recipient name and a recipient address.

30. A system according to claim 16, the memory further comprising an instruction configured to insert an advertisement into the e-mail message.

31. A method for systematically processing mail a plurality of mail items, comprising:
  receiving the plurality of mail items addressed to a plurality of recipients, each mail item having recipient information and one or more pages enclosed in the mail item, wherein the mail item are postal items;
  scanning the plurality of mail items into image files, each image file including image data of the recipient information and image data of the enclosed one or more pages that correspond to the recipient information and the one or more enclosed pages of a single mail item;
  for each image file, identifying a recipient from the image data of the recipient information in the image file;
  wherein, for each image file, identifying a recipient comprises:
    converting the image data of the recipient information into text by using optical character recognition;
    matching the text of the converted image to profile information associated with a recipient, wherein the profile information associated with the recipient is stored in a database that comprises profile information for a plurality of recipients;
  calculating a confidence level of a match between the text of the converted image and the profile information associated with the recipient;
  comparing the calculated confidence level of the match to a threshold; and
  identifying a recipient for the image file based on the outcome of the comparison of the calculated confidence level of the match to the threshold, and
  making the image files available to the identified recipients of the image files, wherein, for each image file, the image file is not made available to the identified recipient if the image file does not comply with one or more recipient preferences;
    wherein, for each image file, making the image files available further comprises at least one of transmitting an e-mail message, based on an e-mail address obtained from the profile information, to the identified recipient of that image file, or storing the image file in a database accessible to the identified recipient of that image file.

32. A method according to claim 31, wherein the email message includes a link to the images file stored in the database.

33. A method according to claim 31, further comprising:
prompting an operator to check the image file if the confidence level is below the threshold.

34. A method according to claim 31, further comprising:
storing the one or more recipient preferences in a database for the identified recipient; and
determining how to process the image file based on the one or more recipient preferences of the identified recipient.

35. A method according to claim 34, wherein the one or more recipient preferences of the identified recipient include an image file format, a size of the image file, an indication of whether to include the image file in the transmitted e-mail or to include a link to the image file stored in the database in the transmitted e-mail, an image quality, and the e-mail address.

36. A method according to claim 31, wherein the recipient information includes a caller box number and a recipient box number.

37. A method according to claim 36, wherein the caller box number is associated with a plurality of recipients and a particular post office location, and the recipient box number is unique to each recipient of the associated caller box number, such that each combination of caller box number and recipient box number is unique.

38. A method according to claim 31, wherein each mail item comprises an envelope.

39. A method according to claim 31, further comprising scanning a return address on the mail item.

40. A method according to claim 39, wherein the e-mail message includes an image of the the recipient and return address.

41. A method according to claim 31, further comprising:
converting the entire image file into text;
determining if the text includes one or more keywords; and
identifying the mail item as a predetermined type of document based on the determination.

42. A method according to claim 41, further comprising routing the e-mail message in accordance with the identified type of document.

43. A method according to claim 31, wherein the recipient information includes at least a recipient name and a recipient address.

44. A method according to claim 31, further comprising inserting an advertisement into the e-mail message.

45. A system for systematically processing a plurality of mail items, comprising:
a scanner configured to scan the plurality of mail items addressed to a plurality of recipients into image files, each image file including image data of the recipient information and image data of one or more pages, wherein the mail item is a postal mail item;
a processor; and
a memory, coupled to the processor, the memory comprising a plurality of instructions executed by the processor, the plurality of instructions configured to:
receive the image files from the scanner;
for each image file, identify a recipient from the image data of the recipient information in the image file, wherein the plurality of instructions for identifying the recipient comprises instructions to:
for each image file, convert the image data of the recipient information into text using optical character recognition;
for each image file, match the text of the converted image to profile information associated with a recipient, wherein the profile information associated with the recipient is stored in a database that comprises profile information for a plurality of recipients;
for each image file, calculate a confidence level of a match between the text of the converted image and the profile information associated with the recipient; and
for each image file, compare the calculated confidence level of the match to a threshold; and
for each image file, identify a recipient for each image file based outcome of the comparison of the calculated confidence level of the match to the threshold, and
make the image files available to the identified recipients of the image files, wherein, for each image file, the image file is not made available to the identified recipient if the image file does not comply with one or more recipient preferences;
wherein, for each image file, making the image files available further comprises at least one of transmitting an e-mail message, based on an e-mail address in the profile information, to the identified recipient of that image file, or storing the image file in a database accessible to the identified recipient of that image file.

46. A system according to claim 45, wherein the e-mail message includes a link to the image file stored in the database.

47. A system according to claim 45, the memory further comprising instructions configured to:
prompt an operator to check the image file if the confidence level is below the threshold.

48. A system according to claim 45, the memory further comprising instructions configured to:
store the one or more recipient preferences in a database; and determine how to process each image file based on the one or more recipient preferences of the identified recipient.

49. A system according to claim 48, wherein the one or more recipient preferences of the identified recipient include an image file format, a size of the image file, an indication of whether to include the image file in the transmitted e-mail or to include a link to the image file stored in the database in the transmitted e-mail, an image quality, and the e-mail address.

50. A system according to claim 45, wherein the recipient information includes a caller box number and a recipient box number.

51. A system according to claim 50, wherein the caller box number is associated with a plurality of recipients and a particular post office location, and the recipient box number is unique to each recipient of the associated caller box number, such that each combination of caller box number and recipient box number is unique.

52. A system according to claim 45, wherein each mail item comprises an envelope.

53. A system according to claim 45, wherein the scanner is further configured to scan a return address on each mail item.

54. A system according to claim 53, wherein the c-mail message includes an image of the the recipient and return address.

55. A system according to claim 45, the memory further comprising instructions configured to:

convert the entire image file into text;

determine if the text includes one or more keywords; and identify the mail item as a predetermined type of document based on the determination.

56. A system according to claim 55, the memory further comprising an instruction configured to route the e-mail message in accordance with the identified type of document.

57. A system according to claim 45, wherein the recipient information includes at least a recipient name and a recipient address.

58. A system according to claim 45, wherein the e-mail message includes an advertisement.

* * * * *

UNITED STATES PATENT AND TRADEMARK OFFICE
CERTIFICATE OF CORRECTION

PATENT NO. : 7,693,942 B2  Page 1 of 1
APPLICATION NO. : 10/241008
DATED : April 6, 2010
INVENTOR(S) : David S. Nale It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 833 days.

Signed and Sealed this

Ninth Day of November, 2010

David J. Kappos
*Director of the United States Patent and Trademark Office*